US010550718B2

(12) United States Patent
Fracchia et al.

(10) Patent No.: US 10,550,718 B2
(45) Date of Patent: Feb. 4, 2020

(54) GAS TURBINE ENGINE FAN BLADE CONTAINMENT SYSTEMS

(71) Applicant: THE BOEING COMPANY, Chicago, IL (US)

(72) Inventors: Carlos Angelo Fracchia, Ballwin, MO (US); Karen M. Jost, St. Louis, MO (US); Mark David Higgins, Woodinville, WA (US); Colleen M. Harper, Lake St. Louis, MO (US); David Miltenberger, Melbourne, FL (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 15/476,027

(22) Filed: Mar. 31, 2017

(65) Prior Publication Data

US 2018/0283204 A1 Oct. 4, 2018

(51) Int. Cl.
| | | |
|---|---|---|
| *F01D 21/04* | (2006.01) | |
| *F01D 25/24* | (2006.01) | |
| *F04D 29/52* | (2006.01) | |
| *B64D 27/20* | (2006.01) | |
| *B64D 29/06* | (2006.01) | |

(52) U.S. Cl.
CPC .......... *F01D 21/045* (2013.01); *B64D 27/20* (2013.01); *B64D 29/06* (2013.01); *F01D 25/243* (2013.01); *F04D 29/522* (2013.01); *F04D 29/526* (2013.01); *F05D 2220/323* (2013.01); *Y02T 50/672* (2013.01)

(58) Field of Classification Search
CPC ...... F01D 21/045; F01D 25/24; F01D 25/243; F05D 2240/14; F04D 29/526; F04D 29/522; Y10T 403/32221
See application file for complete search history.

(56) References Cited

U.S. PATENT DOCUMENTS

| | | | |
|---|---|---|---|
| 3,602,602 A | 8/1971 | Motta | |
| 3,722,355 A | 3/1973 | King | |
| 3,801,416 A | 4/1974 | Gulbierz | |
| 3,855,632 A | 12/1974 | Davis | |
| 3,924,038 A | 12/1975 | McArdle et al. | |

(Continued)

FOREIGN PATENT DOCUMENTS

| | | |
|---|---|---|
| EP | 2447157 | 5/2012 |
| GB | 2262313 | 6/1993 |

OTHER PUBLICATIONS

European Patent Office, "Extended European Search Report," issued in connection with European Patent Application No. 18158036.6, dated Oct. 24, 2018, 13 pages.

(Continued)

*Primary Examiner* — Kenneth J Hansen
(74) *Attorney, Agent, or Firm* — Hanley, Flight & Zimmerman, LLC

(57) ABSTRACT

Gas turbine engine fan blade containment systems are disclosed. An example fan blade containment system includes a shield to be coupled to an aircraft structure and to at least partially surround a circumference of an aircraft engine. The shield is to be spaced from an outer surface the aircraft engine when the shield is coupled to the aircraft structure. A shield termination fitting is to couple a terminating end of the shield to the aircraft structure.

22 Claims, 14 Drawing Sheets

(56) References Cited

U.S. PATENT DOCUMENTS

| | | |
|---|---|---|
| 3,936,219 A | 2/1976 | Holmes |
| 3,974,313 A | 8/1976 | James |
| 3,989,407 A | 11/1976 | Cunningham |
| 4,044,550 A | 8/1977 | Vermilye |
| 4,057,359 A | 11/1977 | Grooman |
| 4,063,847 A | 12/1977 | Simmons |
| 4,090,005 A | 5/1978 | Morgan |
| 4,125,053 A | 11/1978 | Lasker |
| 4,149,824 A | 4/1979 | Adamson |
| 4,197,052 A | 4/1980 | Lardellier |
| 4,199,300 A | 4/1980 | Tubbs |
| 4,200,677 A | 4/1980 | Bottini et al. |
| 4,377,370 A | 3/1983 | Porcelli |
| 4,397,608 A | 8/1983 | Husain et al. |
| 4,411,589 A | 10/1983 | Joubert et al. |
| 4,417,848 A | 11/1983 | Dembeck |
| 4,425,080 A | 1/1984 | Stanton et al. |
| 4,452,563 A * | 6/1984 | Belanger ............... F01D 21/045 138/110 |
| 4,452,565 A | 6/1984 | Monhardt et al. |
| 4,474,346 A | 10/1984 | Murphy et al. |
| 4,475,864 A | 10/1984 | Patacca et al. |
| 4,484,856 A | 11/1984 | Patacca |
| 4,490,092 A | 12/1984 | Premont |
| 4,500,252 A | 2/1985 | Monhardt et al. |
| 4,503,104 A | 3/1985 | Belanger et al. |
| 4,534,968 A | 8/1985 | Tomich |
| 4,547,122 A | 10/1985 | Leech |
| 4,566,237 A | 1/1986 | Turner |
| 4,584,228 A | 4/1986 | Droste |
| 4,598,449 A | 7/1986 | Monhardt et al. |
| 4,639,188 A | 1/1987 | Swadley |
| 4,648,795 A | 3/1987 | Lardellier |
| 4,666,371 A | 5/1987 | Alderson |
| 4,699,567 A | 10/1987 | Stewart |
| 4,705,454 A | 11/1987 | Bouiller et al. |
| 4,718,818 A | 1/1988 | Premont |
| 4,818,176 A | 4/1989 | Huether et al. |
| 4,836,084 A | 6/1989 | Vogelesang et al. |
| 4,878,821 A | 11/1989 | Huether et al. |
| 4,902,201 A | 2/1990 | Neubert |
| 4,917,569 A | 4/1990 | Kimberlin |
| 4,934,899 A | 6/1990 | Patacca |
| 4,961,685 A | 10/1990 | Neubert |
| 5,160,248 A | 11/1992 | Clarke |
| 5,163,809 A | 11/1992 | Akgun et al. |
| 5,188,505 A | 2/1993 | Schilling et al. |
| 5,259,724 A | 11/1993 | Liston et al. |
| 5,272,954 A | 12/1993 | Crouch |
| 5,273,393 A | 12/1993 | Jones et al. |
| 5,328,324 A | 7/1994 | Dodd |
| 5,336,044 A | 8/1994 | Forrester |
| 5,344,280 A | 9/1994 | Langenbrunner et al. |
| 5,403,148 A | 4/1995 | Forrester |
| 5,408,826 A | 4/1995 | Stewart et al. |
| 5,409,349 A | 4/1995 | Kulak et al. |
| 5,413,456 A | 5/1995 | Kulak et al. |
| 5,431,532 A | 7/1995 | Humke et al. |
| 5,437,538 A | 8/1995 | Mitchell |
| 5,443,365 A | 8/1995 | Ingling et al. |
| 5,447,411 A | 9/1995 | Curley et al. |
| 5,482,429 A | 1/1996 | Penda |
| 5,486,086 A | 1/1996 | Bellia et al. |
| 5,513,949 A | 5/1996 | Armstrong |
| 5,516,257 A | 5/1996 | Kasprow et al. |
| 5,605,441 A | 2/1997 | Boszor et al. |
| 5,613,830 A | 3/1997 | Chan et al. |
| 5,622,472 A | 4/1997 | Glowacki |
| 5,823,739 A | 10/1998 | Van Duyn |
| 5,851,932 A | 12/1998 | Dickson et al. |
| 5,885,056 A | 3/1999 | Goodwin |
| 6,003,424 A | 12/1999 | Cordova et al. |
| 6,053,696 A | 4/2000 | Roberts |
| 6,059,523 A | 5/2000 | Modafferi et al. |
| 6,059,524 A | 5/2000 | Costa et al. |
| 6,113,347 A | 9/2000 | Forrester |
| 6,120,242 A | 9/2000 | Bonnoitt et al. |
| 6,146,089 A | 11/2000 | Allen et al. |
| 6,149,380 A | 11/2000 | Kuzniar et al. |
| 6,179,551 B1 | 1/2001 | Sathianathan et al. |
| 6,182,531 B1 | 2/2001 | Gallagher et al. |
| 6,206,155 B1 | 3/2001 | Schneider |
| 6,206,631 B1 | 3/2001 | Schilling |
| 6,217,277 B1 | 4/2001 | Liu et al. |
| 6,224,321 B1 | 5/2001 | Ebden et al. |
| 6,227,794 B1 | 5/2001 | Wojtyczka et al. |
| 6,290,455 B1 | 9/2001 | Hemmelgarn et al. |
| 6,371,721 B1 | 4/2002 | Sathianathan et al. |
| 6,394,746 B1 | 5/2002 | Sathianathan et al. |
| 6,468,026 B1 | 10/2002 | Bonnoitt et al. |
| 6,497,550 B2 | 12/2002 | Booth |
| 6,543,991 B2 | 4/2003 | Sathianathan et al. |
| 6,575,694 B1 | 6/2003 | Thompson et al. |
| 6,612,217 B1 | 9/2003 | Shockey et al. |
| 6,637,186 B1 | 10/2003 | Van Duyn |
| 6,638,008 B2 | 10/2003 | Sathianathan et al. |
| 6,652,222 B1 | 11/2003 | Wojtyczka et al. |
| 6,695,574 B1 | 2/2004 | Mather |
| 6,739,830 B2 | 5/2004 | Sathianathan et al. |
| 6,769,864 B2 | 8/2004 | Sathianathan et al. |
| 6,814,541 B2 | 11/2004 | Evans et al. |
| 6,829,883 B2 | 12/2004 | Sathianathan et al. |
| 6,837,674 B2 | 1/2005 | Phillips, III |
| 6,913,436 B2 | 7/2005 | McMillan et al. |
| 6,979,172 B1 | 12/2005 | Mackenzie |
| 7,008,173 B2 | 3/2006 | Gabrys et al. |
| 7,076,942 B2 | 7/2006 | Schreiber |
| 7,087,296 B2 | 8/2006 | Porter |
| 7,192,243 B2 | 3/2007 | Lawson et al. |
| 7,246,990 B2 | 7/2007 | Xie et al. |
| 7,255,528 B2 | 8/2007 | Stretton |
| 7,338,250 B2 | 3/2008 | Martindale et al. |
| 7,390,161 B2 | 6/2008 | Xie et al. |
| 7,402,022 B2 | 7/2008 | Harper et al. |
| 7,445,421 B2 | 11/2008 | Sathianathan |
| 7,503,164 B2 | 3/2009 | McMillan |
| 7,513,734 B2 | 4/2009 | McMillan |
| 7,517,184 B2 | 4/2009 | Costa et al. |
| 7,524,161 B2 | 4/2009 | Lawson et al. |
| 7,597,040 B2 | 10/2009 | Gabrys |
| 7,604,199 B2 | 10/2009 | McMillan et al. |
| 7,713,021 B2 | 5/2010 | Finn et al. |
| 7,766,603 B2 | 8/2010 | Beckford et al. |
| 7,806,364 B1 | 10/2010 | Udall |
| 7,866,939 B2 | 1/2011 | Harper et al. |
| 7,874,136 B2 | 1/2011 | Heyerman |
| 7,914,251 B2 | 3/2011 | Pool et al. |
| 7,954,418 B2 | 6/2011 | Gabrys |
| 7,959,405 B2 | 6/2011 | Launders |
| 8,016,543 B2 | 9/2011 | Braley et al. |
| 8,021,102 B2 | 9/2011 | Xie et al. |
| 8,029,231 B2 | 10/2011 | Evans |
| 8,046,915 B2 | 11/2011 | Xie et al. |
| 8,047,764 B2 | 11/2011 | Launders |
| 8,061,966 B2 | 11/2011 | Xie et al. |
| 8,087,873 B2 | 1/2012 | Cacace |
| 8,166,746 B2 | 5/2012 | Heyerman |
| 8,191,254 B2 | 6/2012 | Cardarella, Jr. |
| 8,202,041 B2 | 6/2012 | Wojtyczka et al. |
| 8,231,328 B2 | 7/2012 | Reed |
| 8,297,912 B2 | 10/2012 | Reed |
| 8,317,456 B2 | 11/2012 | Cardarella, Jr. |
| 8,333,558 B2 | 12/2012 | Finn et al. |
| 8,371,803 B2 | 2/2013 | Evans |
| 8,403,624 B2 | 3/2013 | Xie et al. |
| 8,425,178 B2 | 4/2013 | Lenk |
| 8,434,995 B2 | 5/2013 | Pool et al. |
| 8,454,298 B2 | 6/2013 | Cardarella, Jr. |
| 8,528,328 B2 | 9/2013 | Stroph et al. |
| 8,545,167 B2 | 10/2013 | Cheung |
| 8,591,172 B2 | 11/2013 | Bottome |
| 8,647,049 B2 | 2/2014 | Evans et al. |
| 8,662,824 B2 | 3/2014 | Chatelois et al. |
| 8,672,609 B2 | 3/2014 | Lussier et al. |

(56) References Cited

U.S. PATENT DOCUMENTS

| | | |
|---|---|---|
| 8,757,958 B2 | 6/2014 | Lussier |
| 8,807,918 B2 | 8/2014 | Hagshenas |
| 8,827,629 B2 | 9/2014 | Voleti et al. |
| 8,858,156 B2 | 10/2014 | Swenson et al. |
| 8,869,673 B2 | 10/2014 | Townsend et al. |
| 8,926,277 B2 | 1/2015 | Walters |
| 8,986,797 B2 | 3/2015 | Xie |
| 9,032,706 B2 | 5/2015 | Marshall |
| 9,062,565 B2 | 6/2015 | Mahan |
| 9,085,992 B2 | 7/2015 | Evans |
| 9,097,139 B2 | 8/2015 | McMillan |
| 9,109,462 B2 | 8/2015 | Suciu et al. |
| 9,114,882 B2 * | 8/2015 | Robertson, Jr. ........ B64D 27/26 |
| 9,140,138 B2 | 9/2015 | Corson |
| 9,169,045 B2 | 10/2015 | Clark |
| 9,220,310 B2 | 12/2015 | Hawkins et al. |
| 9,222,368 B2 | 12/2015 | Harper et al. |
| 9,248,612 B2 | 2/2016 | Zhu et al. |
| 9,284,843 B2 | 3/2016 | Koch, IV |
| 9,291,070 B2 | 3/2016 | Fielding et al. |
| 9,321,238 B2 | 4/2016 | Bird et al. |
| 9,341,116 B2 | 5/2016 | Gerez et al. |
| 2001/0028840 A1 | 10/2001 | Booth |
| 2002/0141859 A1 | 10/2002 | Sathianathan et al. |
| 2002/0164244 A1 | 11/2002 | Sathianathan et al. |
| 2003/0138316 A1 | 7/2003 | Sathianathan et al. |
| 2004/0037694 A1 | 2/2004 | Mather |
| 2004/0076508 A1 | 4/2004 | Phillips, III |
| 2004/0146393 A1 | 7/2004 | Evans et al. |
| 2004/0161331 A1 | 8/2004 | Binetruy et al. |
| 2005/0025615 A1 | 2/2005 | Gabrys et al. |
| 2005/0089391 A1 | 4/2005 | Stretton |
| 2005/0276683 A1 | 12/2005 | Lapergue et al. |
| 2007/0081887 A1 | 4/2007 | Xie et al. |
| 2007/0110557 A1 | 5/2007 | Lawson et al. |
| 2007/0253804 A1 | 11/2007 | Heyerman |
| 2007/0280817 A1 | 12/2007 | Costa et al. |
| 2008/0199301 A1 | 8/2008 | Cardarella, Jr. |
| 2008/0232951 A1 | 9/2008 | Cardarella |
| 2009/0067979 A1 | 3/2009 | Braley et al. |
| 2009/0087309 A1 | 4/2009 | Schreiber |
| 2009/0110538 A1 | 4/2009 | Kostka et al. |
| 2009/0155044 A1 | 6/2009 | Xie et al. |
| 2009/0175714 A1 | 7/2009 | Cacace |
| 2009/0226310 A1 | 9/2009 | Finn et al. |
| 2010/0028129 A1 | 2/2010 | Reed |
| 2010/0028130 A1 | 2/2010 | Reed |
| 2010/0077721 A1 | 4/2010 | Marshall |
| 2010/0150696 A1 | 6/2010 | Lenk |
| 2010/0202872 A1 | 8/2010 | Weidmann |
| 2010/0266384 A1 | 10/2010 | Evans et al. |
| 2011/0076132 A1 | 3/2011 | Bottome |
| 2011/0081227 A1 | 4/2011 | McMillan |
| 2011/0138769 A1 | 6/2011 | Costa et al. |
| 2011/0217156 A1 | 9/2011 | McMillan |
| 2012/0039703 A1 | 2/2012 | Swenson et al. |
| 2012/0134774 A1 | 5/2012 | Clark |
| 2012/0207583 A1 | 8/2012 | Voleti et al. |
| 2012/0224949 A1 | 9/2012 | Harper et al. |
| 2013/0055881 A1 | 3/2013 | Bird et al. |
| 2013/0136577 A1 | 5/2013 | Evans |
| 2013/0149103 A1 | 6/2013 | Stevenson et al. |
| 2013/0323008 A1 | 12/2013 | Corson |
| 2013/0336761 A1 | 12/2013 | Evans |
| 2014/0227076 A1 | 8/2014 | Hoyland et al. |
| 2014/0286748 A1 | 9/2014 | Costa et al. |
| 2014/0363270 A1 | 12/2014 | Feldmann et al. |
| 2015/0016945 A1 | 1/2015 | Kappes et al. |
| 2015/0275695 A1 | 10/2015 | Evans et al. |
| 2016/0003084 A1 | 1/2016 | Husband et al. |
| 2016/0053632 A1 | 2/2016 | Watson |
| 2018/0230855 A1 | 8/2018 | Heeter |
| 2018/0320633 A1 | 11/2018 | Moniz et al. |

OTHER PUBLICATIONS

United States Patent and Trademark Office, "Notice of Allowance and Fee(s) Due," issued in connection with U.S. Appl. No. 15/476,038, dated Jul. 22, 2019, 17 pages.

United States Patent and Trademark Office, "Non-Final Office Action," issued in connection with U.S. Appl. No. 15/476,038, dated Feb. 11, 2019, 35 pages.

European Patent Office, "Communication pursuant to Article 94(3)," issued in connection with European Patent Application No. 18 158 039.0, dated Oct. 4, 2019, 6 pages.

European Patent Office, "Communication pursuant to Article 94(3) EPC," issued in connection with European Patent Application No. 18 158 036.6, dated Oct. 29, 2019, 4 pages.

\* cited by examiner

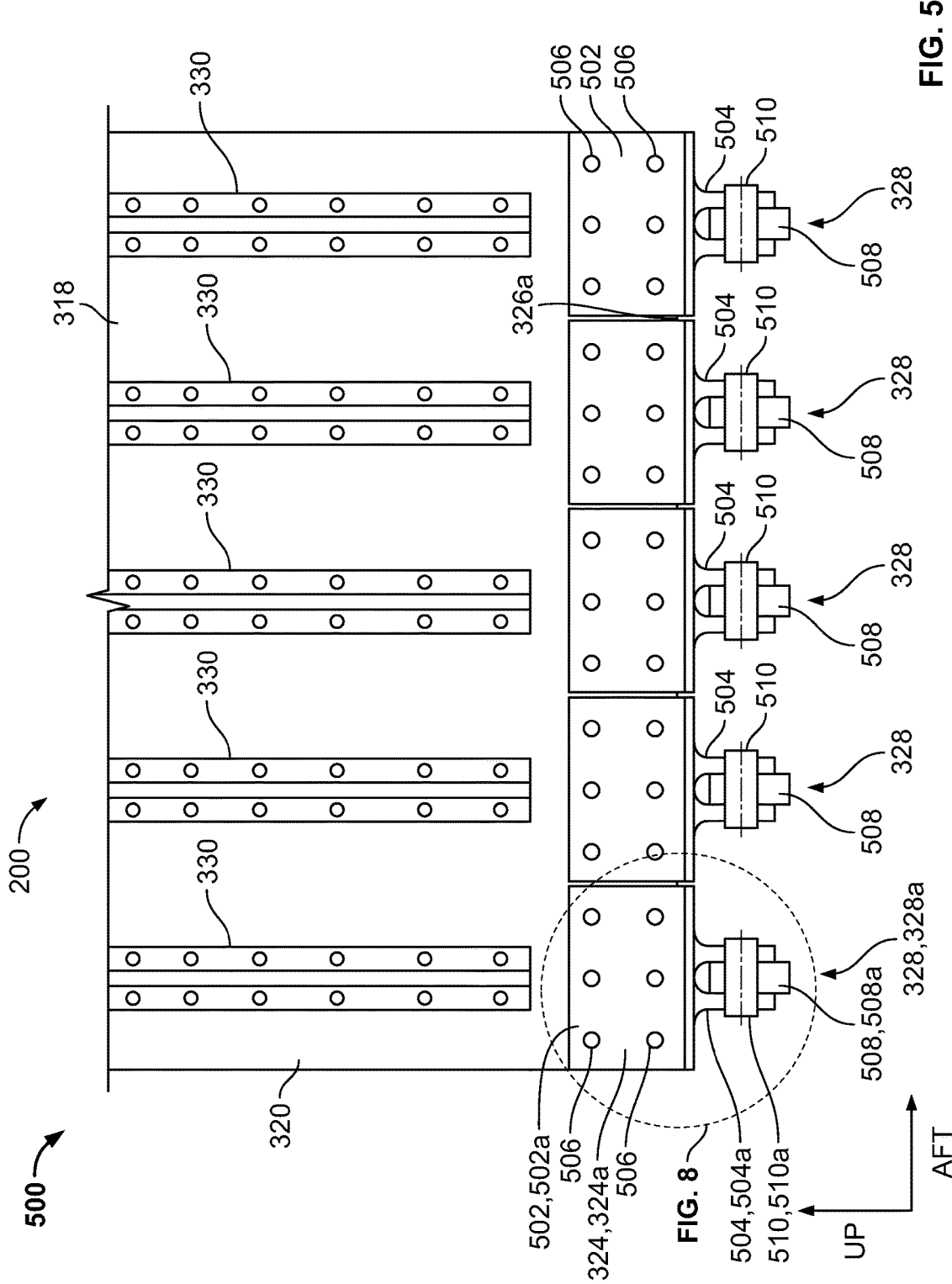

US 10,550,718 B2

GAS TURBINE ENGINE FAN BLADE CONTAINMENT SYSTEMS

FIELD OF THE DISCLOSURE

This disclosure relates generally to aircraft gas turbine engines and, more particularly, to fan blade containment systems.

BACKGROUND

For safety and survivability reasons, airplanes with multiple gas turbine engines are typically required to have gas turbine engine fan blade containment (GTEFBC) systems and these systems are typically integrated with each engine. In the event of a fan blade failure, these systems prevent fan blade fragments from being ejected through the fan casing of the faulty engine. By doing so, these systems protect the surrounding engines, critical subsystems, weapons, and airframe structure from damage and allow the pilot to continue flying and safely land the airplane. Airplanes with a single jet engine, on the other hand, are typically not required to have GTEFBC systems because they add weight and cost to the aircraft and because they may actually reduce the likelihood of survival of the pilot and the aircraft. That is because an ejected fan blade that is contained within an engine housing does more damage to the surrounding fan blades and engine machinery than a fan blade that is allowed to escape. In the event of a fan blade failure in a single engine airplane, the pilot will either eject immediately or attempt to continue flying and land, depending on the severity of the damage to the vehicle.

BRIEF DESCRIPTION OF THE DRAWINGS

FIG. 5 is a close-up side view of the fan blade containment shield and shield termination fittings of the example fan blade containment system taken along line 5-5 of FIG. 3.

Figure 1:
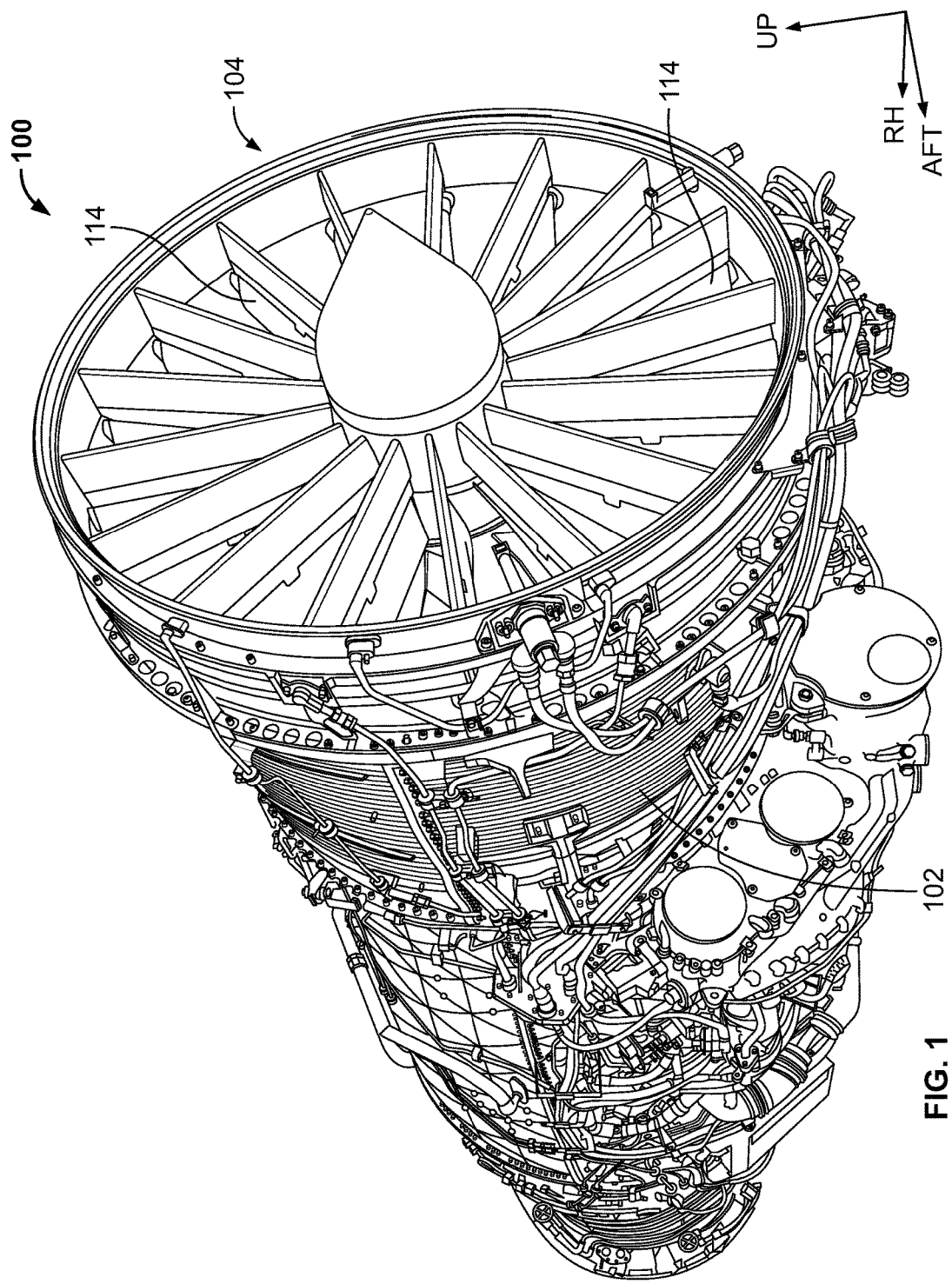
FIG. 1 is an example aircraft engine that was designed without an integral fan blade containment system.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples are described throughout this specification. Any features from any example may be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part (e.g., with one or more intermediate part(s) located there between). Stating that any part is in direct contact with another part means that there is no intermediate part between the two parts.

SUMMARY

An example fan blade containment system includes a shield to be coupled to an aircraft structure and to at least partially surround a circumference of an aircraft engine. The shield is to be spaced from an outer surface of the aircraft engine when the shield is coupled to the aircraft structure. A shield termination fitting is to couple a terminating end of the shield to the aircraft structure.

An example fan blade containment system includes a shield having a unitary body including a first end and a second end opposite the first end. The first end is to couple to a first structural member of an aircraft structure and the second end to couple to a second structural member of the aircraft structure. The shield includes impact absorbing material that is to absorb kinetic energy from fan blade fragments during a fan blade failure event. A first shield termination fitting has a first body and a first clevis. The first body defines a first cavity to receive the first end of the shield and the first clevis to couple the first end of the shield to the aircraft structure. A second shield termination fitting has a second body and a second clevis. The second body defines a second cavity to receive the second end of the shield. The second clevis is to couple the second end of the shield to the aircraft structure.

A fan blade containment system includes means for capturing fan blade fragments and absorbing their impact energy during a fan blade failure event of an aircraft engine. The means for capturing and absorbing has a terminating end to couple to an aircraft structure. The means for capturing and absorbing is to be spaced from an outer surface of the aircraft engine when the means for absorbing is coupled to the aircraft structure. The fan blade containment system includes means for coupling the means for capturing and absorbing to the aircraft structure, and means for fastening the terminating end of the means for capturing and absorbing to the means for coupling.

DETAILED DESCRIPTION

Engine selection is one of the most important steps in new aircraft design & development. An aircraft manufacturer can either select an existing production engine that meets all the performance requirements of the new aircraft design or, if no such production engine exists, the aircraft manufacturer can work with an engine company to develop a new engine design that will meet all the requirements. As used herein, a production engine may be an engine that has been designed, tested, and certified and is in current production by an engine manufacturer. Designing, developing, testing, and certifying a new engine is a very expensive and time consuming process. Thus, aircraft manufacturers prefer to select a production engine (e.g., an "off the self" production engine) over investing in a new engine design and development effort.

When developing a new multi-engine airplane, an aircraft manufacturer usually selects a production engine designed with an integrated fan blade containment system (e.g., an integrated, continuous hoop GTEFBC system). Integrated fan blade containment systems are typically formed as a continuous hoop or cylinder (e.g., having a circular cross-section) that wraps around the entire circumference of an aircraft engine. Such known fan blade containment systems provide a light weight and/or optimal system given that these fan blade containment systems are designed concurrently with the aircraft engine.

However, selecting an aircraft engine with an integrated, continuous hoop GTEFBC system limits the number of production engines that are available for selection and these engines may not be optimal for a new vehicle (e.g. due to limited performance characteristics). As an alternative strategy, an aircraft manufacturer may select an engine that was originally designed without an integrated, continuous hoop GTEFBC system (e.g. an engine originally designed for a single engine airplane) and may request that the engine company redesign the engine to include an integrated, continuous hoop GTEFBC system. However, redesigning an engine to include an integrated fan blade containment system (e.g., a continuous hoop system) typically requires retesting and recertification of the redesigned engine, which can be exceedingly expensive and may prolong the vehicle development schedule. Thus, redesigning an aircraft engine to include an integrated fan blade containment system diminishes the cost and the schedule advantages of selecting an existing production engine.

Therefore, it is quite possible that the best existing production engine selected for a new multi-engine airplane does not have an integrated GTEFBC system (i.e. the engine was originally designed for a single engine plane). Rather than redesign the engine with an integrated GTEFBC system, and then retest, and requalify the engine, the example methods and apparatus disclosed herein provide an economical and effective engine fan blade containment system that may be integrated with the airframe and completely external to the engine.

The example fan blade containment systems disclosed herein are not integrated with the engine. In some examples, example fan blade containment systems disclosed herein do not form a continuous circumferential hoop around the engine. Example fan blade containment systems disclosed herein include a shield, placed between the engine and the surrounding airframe, that is to be coupled to the aircraft structure and that is to at least partially surround a circumference of the aircraft engine. In this example system, an ejected fan blade can escape the engine housing, thus minimizing damage to the engine machinery, but is prevented from escaping the engine bay of the airframe, thus minimizing the risk of damage to adjacent engines, airframe structure, subsystems, weapons, fuel tanks, etc. To save weight and cost, the shield may provide fan blade containment protection only to critical aircraft systems (e.g., partially surround a circumference of an aircraft engine to minimize the weight of example blade containment systems disclosed herein).

Example fan blade containment systems disclosed herein enable an aircraft manufacturer to select an optimal production engine for a new multi-engine aircraft regardless of whether the production engine includes an integrated fan blade containment system or not. The example fan blade containment systems disclosed herein can be implemented with existing production aircraft engines without requiring retesting and/or recertification of an aircraft engine. In this manner, an aircraft manufacturer avoids the costs and/or schedule impact of redesigning, retesting and/or recertifying an engine that was originally designed without an integrated fan blade containment system.

Example fan blade containment systems disclosed herein partially surround a circumference of an aircraft engine. In some such examples, the example fan blade containment systems disclosed herein include a shield or shield body having a first end anchored to a first aircraft structural member (e.g., an aircraft keel) and a second end opposite the first end anchored to a second aircraft structural member. To enable attachment of the shield body to the aircraft structure, the example fan blade containment systems disclosed herein employ connectors positioned at the respective first and second ends of the shield body. For example, the connectors anchor the first and second ends of the shield body to the aircraft structure. Henceforth, these connectors shall be referred to as shield termination fittings. In some examples, these shield termination fittings form a pinned lug-and-clevis joint when coupled to the aircraft structure. In some examples, the shield termination fittings may be any type of fastener(s) such as, for example, bolts, clamps, steel cables, etc., and/or any other attachment fittings that form a joint when coupled to the aircraft structure.

Example shields of example fan blade containment systems disclosed herein provide adequate clearance to the outer surface of the aircraft engine to provide space for engine bay ventilation, pathways for subsystems routings, and room to allow for routine engine and engine bay maintenance (e.g. without engine or shield removal, etc.). To ensure normal engine operation, it is important that the shield not insulate or restrict airflow around the engine. As used herein, the term "normal operation" means that the aircraft engine operates at temperatures below a threshold maximum engine operating temperature.

Example shields of example fan blade containment systems disclosed herein may be notched, cut-out, and/or segmented as necessary to accommodate structural obstacles within the engine bay (e.g., the engine mounts). These notches and/or cut-outs produce discontinuities in the fan blade containment protection provided by the shield. In some examples, the aircraft structure or airframe adjacent to these notched, cut-out, and/or segmented areas (e.g., the areas not covered by the shield body) may be reinforced with or fabricated from a high strength material with the ability to absorb large amounts of kinetic energy (e.g., steel) to accommodate or compensate for the discontinuity in fan blade containment protection provided by the shield body. In some such examples, the aircraft structure and/or airframe adjacent to the notched, cut-out, and/or segmented areas of the shield body may include an increased dimensional characteristic (e.g., a greater thickness). In some such examples, the aircraft structure and/or airframe adjacent to the notched, cut-out, and/or segmented areas of the shield body may include a reinforcement plate (e.g., a metal plate composed of stainless steel) to increase a structural characteristic of the aircraft structure and/or airframe. In some examples, the reinforced areas function similarly to the fan blade containment shield body by preventing fan blade fragments from penetrating through the reinforced areas of the aircraft structure and/or airframe that are exposed adjacent to the notched, cut-out, or segmented portions of the shield body. Thus, a notched, cut-out, and/or segmented shield and an aircraft structure that has been selectively reinforced adjacent to the notched, cut-out, and/or segmented areas of the shield can effectively provide continuous fan blade containment protection.

In some examples, the notched, cut-out, and/or segmented areas of the shield may include shield termination fittings to anchor the notched, cut-out, and/or segmented portions of the shield body to the aircraft structure (e.g., via a shield termination fitting and pinned lug and clevis joint). Thus, example shield termination fittings disclosed herein provide mechanical joints for terminating ends of the shield body and/or the notched, cut-out, or segmented areas of the shield body. The example shield termination fittings disclosed herein may include fasteners (e.g., bolts, steel cable, etc.) that couple terminating ends of the shield body to the shield termination fittings. In some examples, the shield body may receive one or more fasteners (e.g., bolts, screws, rivets, cables, wires, etc.) to couple the shield body to the shield termination fittings. In some examples, example shield termination fittings disclosed herein transfer load from the shield body (e.g., a high impact energy absorbing material of the body) to an aircraft structural member (e.g. an aircraft keel, deck or frame).

Example fan blade containment systems disclosed herein may include either a single shield segment or multiple shield segments, depending on the application. Each shield segment may include a unitary body including a first end and a second end opposite the first end. The first end of the example fan blade containment system shield segment may couple to a first aircraft structural member (e.g., a first engine bay keel) and the second end may couple to a second aircraft structural member (e.g., a second engine bay keel). Each shield segment of the example fan blade containment systems disclosed herein may include a kinetic energy absorbing material (e.g., dry Kevlar fibers, dry Kevlar fabric, or any other lightweight, high toughness fiber) that is to prevent high speed fan blade fragments from escaping an engine bay during a fan blade failure event. A first connector (e.g., a shield termination fitting) of the example fan blade containment systems disclosed herein may include a first body and a first fastener (e.g., a first clevis). The first body defines a first cavity to receive the first end of the shield and the first fastener (e.g., a first clevis) to couple the first end of the shield to a first mating coupler (e.g., a first lug) on the aircraft structure. A second connector (e.g., a second shield termination fitting) of the example fan blade containment systems disclosed herein may include a second body and a second fastener (e.g., a second clevis). The second body defines a second cavity to receive the second end of the shield and the second fastener (e.g., a second clevis) is to couple the second end of the shield to a second mating coupler (e.g., a second lug) of the aircraft structure.

FIG. 1 shows a trimetric view of an example aircraft engine 100. The aircraft engine 100 of the illustrated example is an example production gas turbine engine that was originally designed without an integrated fan blade containment system. The aircraft engine 100 of the illustrated example includes a housing 102 that houses an intake fan 104 that includes fan blades 114 that draw air into the aircraft engine 100.

Figure 2:
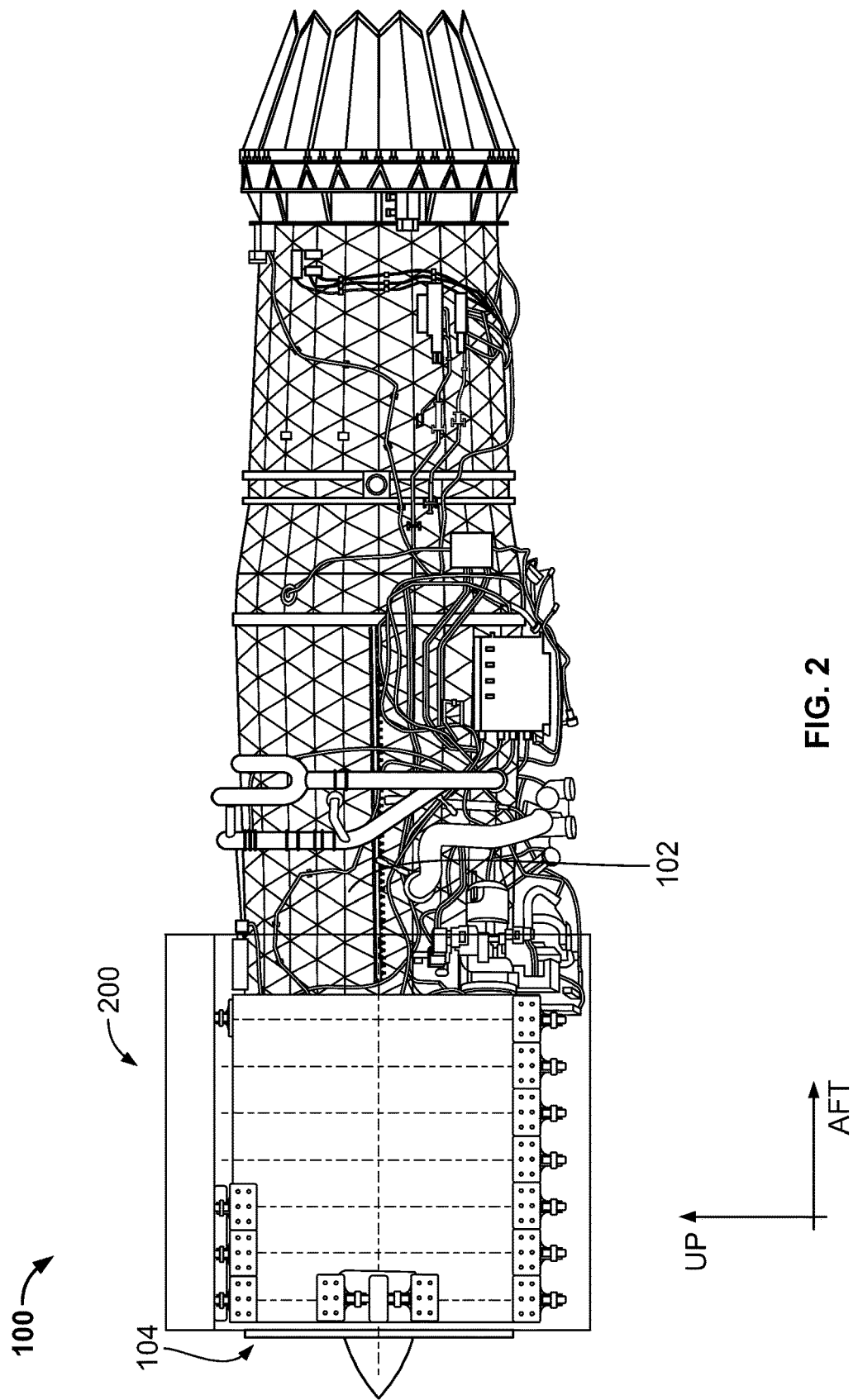
FIG. 2 is a side view of the example aircraft engine of FIG. 1 implemented with an example fan blade containment system in accordance with the teachings of this disclosure.

FIG. 2 is a side view of the example aircraft engine 100 of FIG. 1 implemented with an example fan blade containment system 200 constructed in accordance with the teachings of this disclosure. The fan blade containment system 200 of the illustrated example is capable of capturing fragments of the fan blades 114 of the intake fan 102 as a result of fan blade failure.

Figure 3:
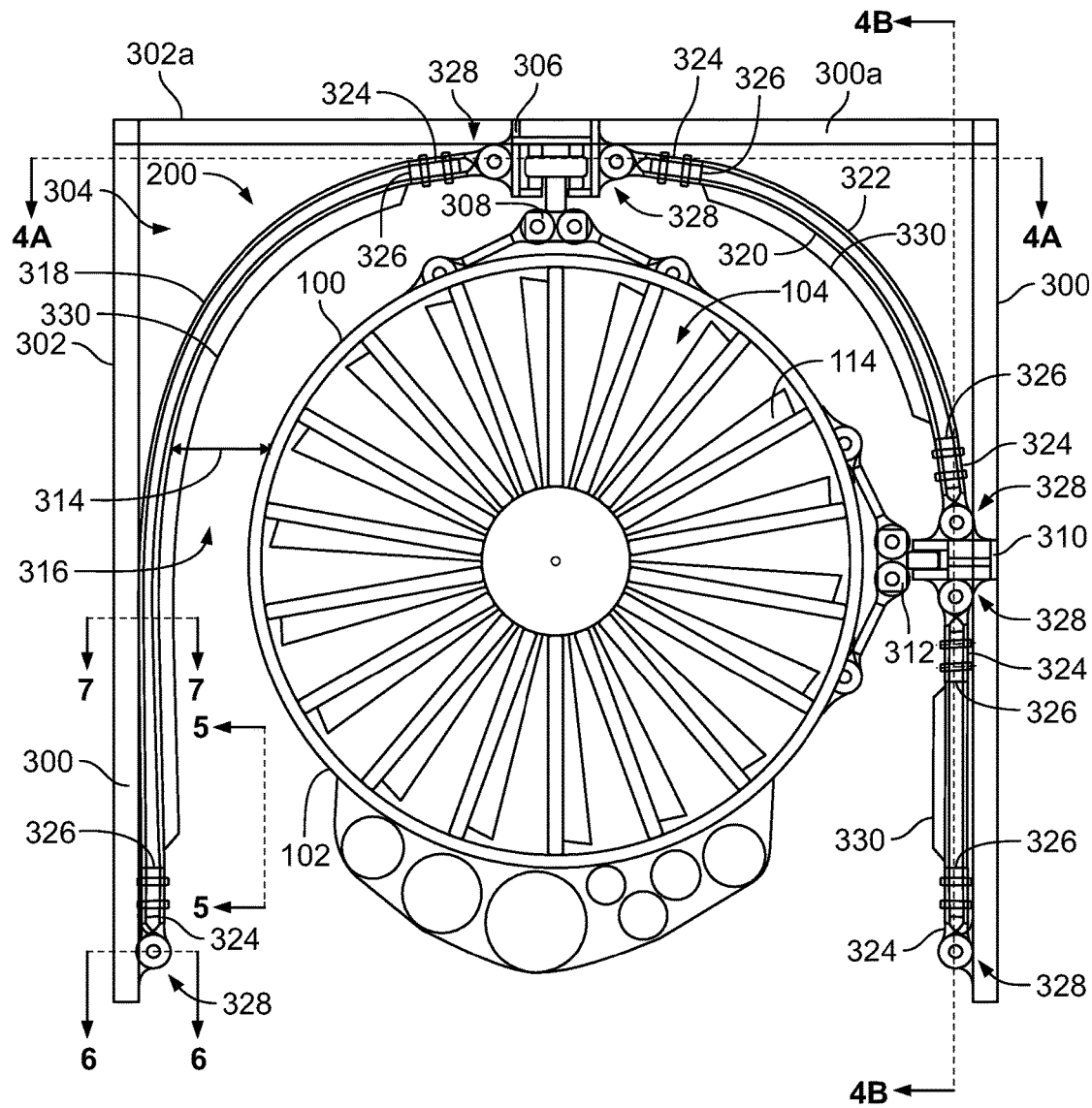
FIG. 3 is a front view of the example aircraft engine and the example fan blade containment system of FIG. 2.

FIG. 3 is a front view of the example aircraft engine 100 and the fan blade containment system 200 of FIG. 2. The aircraft engine 100 and the fan blade containment system 200 of the illustrated example are mounted to an aircraft structure 302 of an aircraft 302a. For example, the aircraft engine 100 and the fan blade containment system 200 of the illustrated example are positioned within an engine bay 304 of the aircraft 302a. The engine bay 304 of the illustrated example is formed by engine bay keels 300 and an upper engine bay deck 300a. The aircraft engine 100 of the illustrated example is coupled to an engine mount hanger link fitting 306 via an engine hanger link 308. In some examples, the engine mount hanger link fitting 306 may be manufactured integral with or mechanically attached (e.g., fastened) to the upper engine bay deck 300a. In addition, the aircraft engine 100 of the illustrated example is coupled with an engine mount side link fitting 310 via a side link 312. In some examples, the engine mount side link fitting 310 may be manufactured integral with or mechanically attached (e.g., fastened) to the engine bay keel 300. The engine hanger link 308 and the side link 312 of the illustrated example are attached to the housing 102 of the aircraft engine 100. Some example aircraft and/or aircraft engine bays may include additional mounting structure(s) and/or mount(s) (e.g., thrust mounts, aft side links, etc.).

The fan blade containment system 200 of the illustrated example is positioned externally relative to the housing 102 of the aircraft engine 100. For example, the fan blade containment system 200 is not directly attached to the housing 102 of the aircraft engine 100 and/or is not positioned inside the housing 102 of the aircraft engine 100. Thus, the fan blade containment system 200 of the illustrated example is not integral with the aircraft engine 100. Although the example fan blade containment system 200 of the illustrated example is not integral with the aircraft engine 100, the example fan blade containment system 200 captures fan blade fragments during blade failure, absorbs impact energy from the fan blade fragments, and transfers the energy to the aircraft structure 302.

The fan blade containment system 200 of the illustrated example is coupled (e.g., directly coupled or anchored) to the aircraft structure 302 of the aircraft 302a. When coupled to the aircraft structure 302, the fan blade containment system 200 of the illustrated example is offset or positioned a distance 314 away from the housing 102 of the aircraft engine 100 to provide spacing 316 between the fan blade containment system 200 and the aircraft engine 100. In this manner, the fan blade containment system 200 does not affect the thermal profile and normal operation of the aircraft engine 100. Thus, an aircraft engine such as the aircraft engine 100 of FIG. 1 that is retrofit with the fan blade containment system 200 of the illustrated example does not require re-testing and/or re-certification because the fan blade containment system 200 does not affect the normal operation of the aircraft engine 100.

Additionally, because the fan blade containment system 200 of the illustrated example is coupled externally relative to the aircraft engine 100, the spacing 316 between the fan blade containment system 200 of the illustrated example and the aircraft engine 100 enables access to the aircraft engine 100 (e.g., engine system routings) and/or the engine bay 304 without having to remove the fan blade containment system 200 (e.g., during routine maintenance of the aircraft engine 100). For example, the fan blade containment system 200 of the illustrated example may be shaped or positioned to provide convenient access to components of the aircraft engine 100 and/or the engine bay 304 of the aircraft 302a.

In some examples, the fan blade containment system 200 of the illustrated example may be replaced with a different fan blade containment system composed of different material(s) (e.g., a lower weight and/or higher strength material(s)). As described in greater detail below, the fan blade containment system 200 of the illustrated example may be formed with varying dimensions and/or volumes, varying material(s) composition, and/or shape to improve performance (e.g., energy absorption) characteristic(s).

The example fan blade containment system 200 of the illustrated example at least partially surrounds a circumference of the aircraft engine 100 (e.g., the fan blades 114 of the intake fan 104). In the illustrated example, the fan blade containment system 200 surrounds a portion of a circumference of the aircraft engine 100 while leaving another portion of the circumference of the aircraft engine 100 uncovered (e.g., exposed). For example, as shown in FIG. 3, the fan blade containment system 200 is positioned around partial areas of the aircraft engine 100 (e.g., lateral sides and a top side of the aircraft engine 100) and other non-critical areas are uncovered (e.g., a bottom side of the aircraft engine 100). A bottom side of the aircraft engine 100, for example, may be a non-critical area because blade fragments that may pierce the engine bay 304 eject in a downward direction during flight and away from other components (e.g., critical components such as weapons, fuel, etc.) of the aircraft 302a. Additionally, providing the fan blade containment system 200 around only a portion (e.g., the critical areas with high probability trajectories) of the aircraft engine 100 reduces weight of the fan blade containment system 200, thereby improving aircraft performance (e.g., fuel efficiency). However, in some examples, the fan blade containment system 200 (e.g., the shield) may be positioned to surround (e.g., encase) the entire circumference of the aircraft engine 100. To enable the fan blade containment system 200 to surround an entire circumference of the aircraft engine 100, the fan blade containment system 200 may include a portion (e.g., a segment) extending underneath the aircraft engine 100 and coupled to another airframe structure (e.g. an engine bay lower cover panel) positioned underneath the aircraft engine 100. To facilitate engine bay access, the lower segment of the shield can be integrated with the lower engine bay cover and can be designed to be removed/installed with the cover during engine bay maintenance activities.

To capture and/or absorb impact energy of fan blade fragments, the fan blade containment system 200 of the illustrated example includes a shield 318. The shield 318 of the illustrated example is a unitary body that is positioned around at least a portion of the aircraft engine 100. The shield 318 of the illustrated example includes a first face or impact face 320 oriented or facing toward the housing 102 of the aircraft engine 100 and a second face or outer face 322 oriented or facing away from the housing 102 of the aircraft engine 100. To couple the shield 318 to the aircraft structure 302, the shield 318 of the illustrated example includes one or more shield termination fittings 324. More specifically, the shield termination fittings 324 couple (e.g., anchor or fix) terminating ends 326 of the shield 318 to the aircraft structure 302. Specifically, the shield termination fittings 324 and the aircraft structure 302 of the illustrated example form a plurality of joints 328 (e.g. high strength joints) when the shield 318 is coupled to the aircraft structure 302. The joints 328 provide a load path to transfer the fan blade impact energy from the shield 318 to the aircraft structure 302. As described below, the joints 328 of the illustrated example may be pinned lug and clevis joints. However, in some examples, the joints may be formed via one or more brackets, fasteners (e.g., nuts and bolts, screws, clamps, brackets, etc.) and/or any other fastener(s). During an impact event, the shield 318 of the illustrated example may flex or stretch when fan blade fragments impact the shield 318. The shield termination fittings 324 of the illustrated example retain or capture the terminating ends 326 of the shield 318 and prevent the terminating ends 326 from decoupling from the aircraft structure 302 during an impact event (e.g., when the shield 318 deflects relative to the terminating ends 326).

To minimize these deflections and to enable the shield 318 to maintain its shape when the aircraft 302a performs flight maneuvers, the shield 318 of the illustrated example includes one or more circumferential stiffeners 330. The stiffeners 330 of the illustrated example are attached to the impact face 320 of the shield 318. In the illustrated example, respective ends of the stiffeners 330 terminate prior to reaching the shield termination fittings 324. The stiffeners 330 of the illustrated example may be machined, formed (e.g., pre-formed) and/or otherwise have a profile substantially similar (e.g., contoured) to the shape of the shield 318 segment to which the stiffeners 330 are attached. For example, the stiffeners 330 of the illustrated example have a curved or arcuate shape or profile similar to the arcuate shape or profile of the shield 318. The stiffeners may be formed of aluminum, carbon/epoxy composite and/or any other suitable material(s).

Figure 4A:
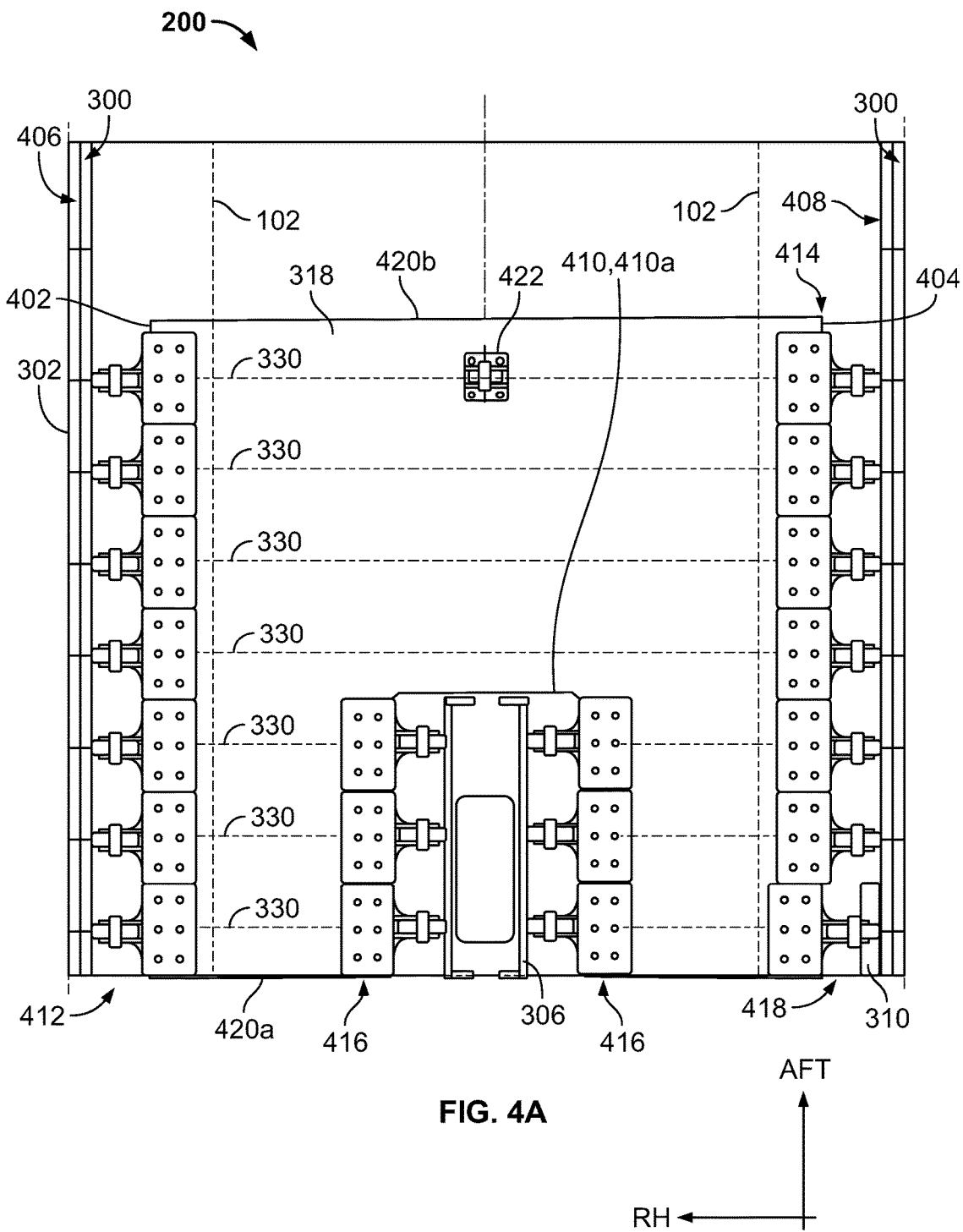
FIG. 4A is a top view of the example aircraft engine and fan blade containment system taken along line 4A-4A of FIG. 3.
Figure 4B:
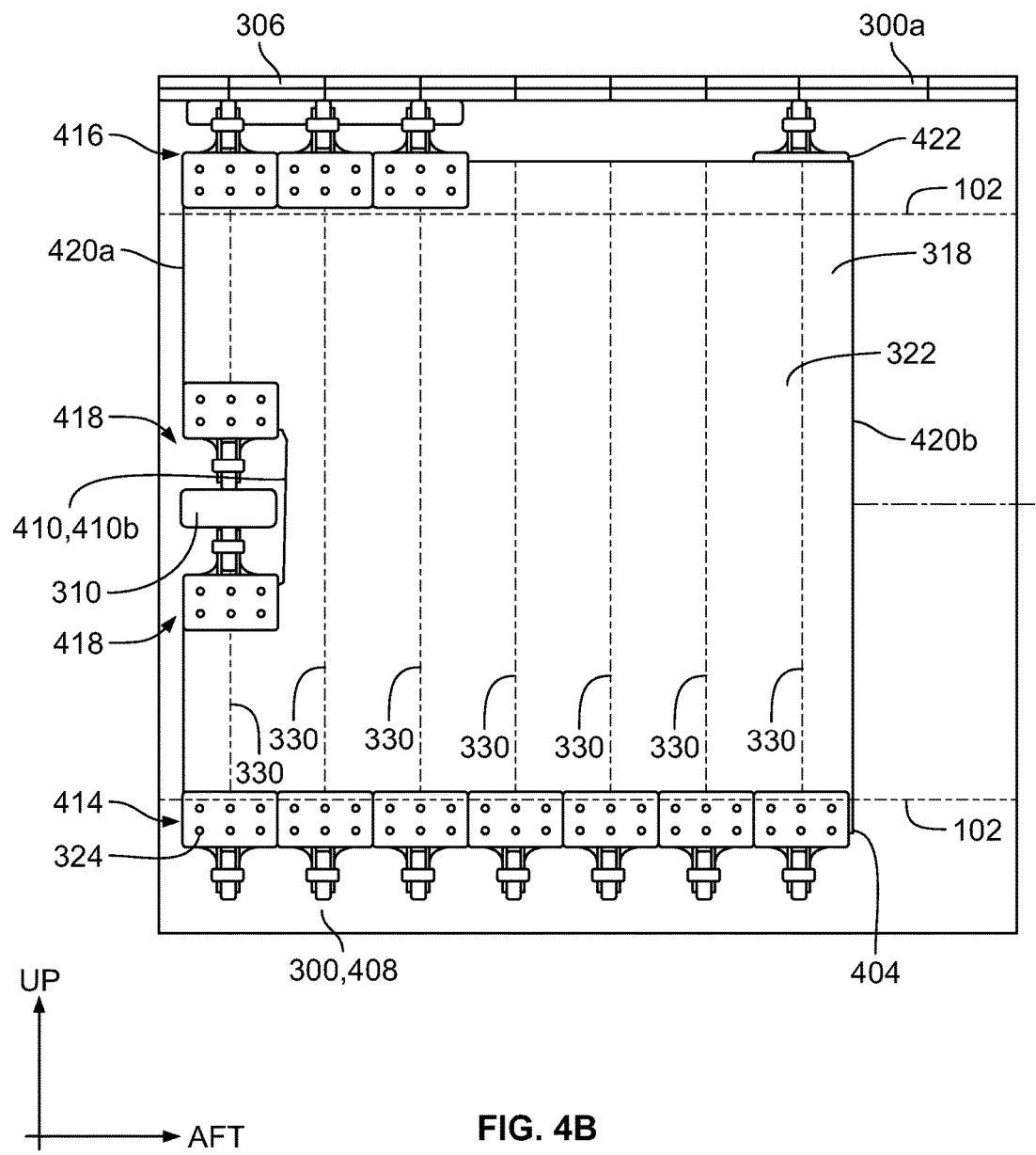
FIG. 4B is a side view of the example aircraft engine and fan blade containment system taken along line 4B-4B of FIG. 3.

FIG. 4A is a top view of the example fan blade containment system 200 of FIGS. 2 and 3. FIG. 4B is a side view of the example fan blade containment system 200 of FIGS. 2, 3 and 4A. The aircraft engine 100 is omitted from FIGS. 4A and 4B for clarity. Referring to FIGS. 4A and 4B, the shield 318 of the illustrated example includes a first end 402 and a second end 404 opposite the first end 402. The first end 402 of the illustrated example is coupled to a first engine bay keel 406 (e.g., a frame or deck) of the aircraft structure 302 and the second end 404 is coupled to a second engine bay keel 408 (e.g., a frame or deck) of the aircraft structure 302. To enable the shield 318 to fit around structural elements or structural obstacles of the aircraft structure 302, the shield 318 of the illustrated example includes one or more notches or cut-out openings 410. For example, the shield 318 of the illustrated example includes a first notched opening 410a (FIG. 4A) adjacent to the engine mount hanger link fitting 306 and a second notched opening 410b (FIG. 4B) adjacent to the engine mount side link fitting 310 to enable the shield 318 to fit around the respective engine hanger link 308 and the side link 312. The first end 402, the second end 404, and/or the openings 410 may form the terminating ends 326 of the shield 318.

In some examples, the aircraft structure 302 may be reinforced (e.g., hardened) to provide fan blade containment in areas of the aircraft structure 302 that are exposed by the one or more notched openings 410 of the shield 318 (i.e., not covered by the shield 318). The reinforced and/or hardened aircraft structure 302 exposed adjacent the one or more notched openings 410 compensates for the discontinuity in the shield 318 of the fan blade containment system 200 and prevents a fan blade fragment from piercing through the aircraft structure 302 exposed by the one or more notched openings 410. To reinforce the aircraft structure 302 (e.g., exposed by the notched openings 410), the aircraft structure 302 may be reinforced with or fabricated from (e.g., composed of) high strength material(s) (e.g. titanium, stainless steel, Inconel, etc.) and/or provided with a thickness increase (e.g., an increased thickness compared to portions of the aircraft structure 302 that are covered by the shield 318). For example, portions of the aircraft structure 302 adjacent to the one or more notched openings 410 (e.g., exposed portions of the aircraft structure 302) may include one or more plates (e.g., stacked plates) composed of high strength material(s) that may be attached or coupled to the aircraft structure 302 adjacent to the one or more opening 410 in order to reinforce the aircraft structure 302. For example, (e.g., at least a portion of) the upper engine bay deck 300a and/or the engine mount hanger link fitting 306 may be reinforced with (e.g., composed of) high strength material(s) (e.g. titanium, stainless steel, Inconel, etc.) and/or provided with a thickness (e.g., an increased thickness) to reinforce the aircraft structure 302 adjacent to (e.g., exposed by) the first notched opening 410a. For example, one or more plates (e.g., stacked plates) composed of high strength material(s) may be attached or coupled to the engine bay deck 300a and/or the engine mount hanger link fitting 306 exposed adjacent to the first notched opening 410a to increase a thickness of the aircraft structure 302 adjacent to (e.g., exposed by) the first notched opening 410a. Likewise, (e.g., at least a portion of) the engine bay keel 300 and/or the engine mount side link fitting 310 positioned (e.g., exposed) adjacent to the second notched opening 410b may also be composed of high strength material(s) (e.g. titanium, stainless steel, Inconel, etc.) and/or provided with an increased thickness to reinforce the aircraft structure 302 exposed by the second notched opening 410b. In some examples, one or more plates may be coupled or attached to the engine bay keel 300 and/or the engine mount side link fitting 310 exposed adjacent to the second notched opening 410b to increase the thickness of the aircraft structure 302 exposed by the second notched opening 410b The first end 402 of the shield 318 of the illustrated example has a first plurality 412 of the shield termination fittings 324 and the second end 404 opposite the first end 402 has a second plurality 414 of the shield termination fittings 324. The first plurality 412 of the shield termination fittings 324 couple (e.g., anchor) the shield 318 to the first engine bay keel 406 and the second plurality 414 of the shield termination fittings 324 couple (e.g., anchor) the second end 404 of the shield 318 to the second engine bay keel 408. The first notched opening 410a of the shield 318 includes a third plurality 416 of the shield termination fittings 324 to couple (e.g., anchor) the shield 318 to the engine mount hanger link fitting 306 and the second notched opening 410b includes a fourth plurality 418 of the shield termination fittings 324 to couple (e.g., anchor) the shield 318 to the engine mount side link fitting 310. In some examples, a front edge 420a and/or a rear edge 420b of the shield 318 may also include the shield termination fittings 324 to couple (e.g., anchor) the respective front edge 420a and/or the rear edge 420b to the aircraft structure 302. Additionally, the shield 318 of the illustrated example includes one or more body couplers 422 that couple the shield 318 to the aircraft structure 302. The body couplers 422 help support the weight of the shield 318 and transfer inertial loads of the shield 318 to the aircraft structure 302. However, in some examples, the body couplers 422 may not be used.

In some examples, one or more of the shield termination fittings 324 may be formed as a unitary body or fitting. For example, the first plurality 412 of the shield termination fittings 324 may be formed as a unitary body (e.g., a single fitting). In some examples, the shield termination fittings 324 may be formed as a unitary body or structure having a length that is substantially similar (e.g., within 1% to 10%) of a length of the shield 318. For example, the first plurality 412 of fittings 324 may be formed as a unitary body that extends between front edge 420a and the rear edge 420b of the shield 318. In some examples, the second plurality 414 of the shield termination fittings 324, the third plurality 416 of the shield termination fittings 324, and/or the fourth plurality 418 of the shield termination fittings 324 may be formed as a unitary body or structure. Although the first plurality 412, the second plurality 414, the third plurality 416 and/or the fourth plurality 418 of the shield termination fittings 324 may be formed unitary fittings or bodies, respectively, each of the unitary fittings may include a plurality of devises that receive a plurality of pins. Thus, although the shield termination fitting 324 may be formed as an elongated unitary body or structure, a fitting formed as a unitary body may include a plurality of devises to provide a plurality of clevis-and-lug joints when the fitting (e.g., the unitary fitting) is coupled to the aircraft structure 302.

As noted above, the shield 318 of the illustrated example has a unitary body between the first end 402 and the second end 404. However, in some examples, the shield 318 may include a plurality of shields or shield segments. For example, the engine mount hanger link fitting 306 and/or the engine mount side link fitting 310 may extend between the front edge 420a and the rear edge 420b (e.g., an entire width of the shield 318 between the front edge 420a and the rear edge 420b). In some such examples, the shield 318 of the illustrated example may include a first shield segment having first and second ends (e.g., terminating ends) coupled to the respective first engine bay keel 406 and the engine mount hanger link fitting 306 extending between the front edge 420a and the rear edge 420b. In some such examples, the shield 318 may include a second shield segment having first and second ends (e.g., terminating ends) coupled to the respective engine mount hanger link fitting and the engine mount side link fitting 310 extending between the front edge 420a and the rear edge 420b. In some such examples, the shield 318 may include a third shield segment having first and second ends (e.g., terminating ends) coupled to the engine mount side link fitting 310 extending between the front edge 420a and the rear edge 420b and the second engine bay keel 408. Each of the respective first and second ends of the shield segments may include the shield termination fittings 324 to couple the respective first and second ends to the aircraft structure 302.

FIG. 5 is a close-up side view of a portion 500 of the example shield 318 of FIGS. 2, 3, 4A and 4B taken along line 5-5 of FIG. 3. The portion 500 of the illustrated example is a terminating end 326a of the shield 318 coupled to the shield termination fittings 324. The portion 500 of the illustrated example can be implemented at the first end 402, the second end 404, the one or more openings 410 (e.g., the first notched opening 410a and the second notched opening 410b), and/or any other portion of the shield 318 defining a terminating end (e.g., the terminating ends 326) of the shield 318 having one or more of the shield termination fittings 324.

The shield termination fittings 324 of the illustrated example are coupled to the terminating end 326a (e.g., the second end 404) of the shield 318. The shield termination fittings 324 of the illustrated example includes a body 502 (e.g., a "clamshell" joint) and a coupler 504 (e.g., a clevis). In the illustrated example, the body 502 is integrally formed with the coupler 504. The coupler 504 of the illustrated example protrudes or projects from the body 502 in a direction away from the body 502 (e.g., a bottom surface of the body 502 in the orientation of FIG. 5). In the illustrated example, the coupler 504 is a clevis. Henceforth, the coupler 504 is referred to as a clevis 504. However, in some examples, the coupler 504 may be any other fastener(s) (e.g., a bolt, a nut, a clamp, bracket, cable, etc.). The body 502 of the illustrated example is coupled to the terminating end 326a of the shield 318 via one or more fasteners 506 (e.g., bolts).

To join the clevis 504 of the shield termination fitting 324 to the aircraft structure 302, the aircraft structure 302 of the illustrated example includes a plurality of connectors 508 (e.g., lugs, etc.). The connectors 508 of the illustrated example are integrally formed and protruding from the aircraft structure 302 (e.g., the first engine bay keel 406, the second engine bay keel 408, the engine mount hanger link fitting 306, and/or the engine mount side link fitting 310). In the illustrated example, the connectors 508 are lugs. Henceforth, the connectors 508 are referred to as lugs 508. However, in some examples, the connectors 508 may be any other fastener(s) (e.g., a bolt, a nut, a clamp, bracket, cable, etc.). The shield termination fittings 324 of the fan blade containment system 200 and the lugs 508 of the aircraft structure 302 form the joints 328 when the shield 318 is coupled to the aircraft structure 302. For example, a respective one of the shield termination fittings 324 receives or couples to a respective one of the lugs 508 of the aircraft structure 302 (e.g., the first engine bay keel 406).

Each of the joints 328 of the illustrated example is a pinned lug and clevis joint (e.g., a clevis fastening system). For example, a clevis (e.g., the clevis 504) of the shield termination fitting 324 receives a respective one of the lugs (e.g., the lugs 508) of the aircraft structure 302. In the illustrated example the clevis 504 of a respective one of the shield termination fittings 324 is coupled to a respective one of the lugs 508 (e.g., the lugs) via a pin 510 (e.g., a bolt, a threaded fastener, etc.). The pin 510 may be composed of high strength steel and/or any other suitable material(s). For example, a first shield termination fitting 324a of the shield 318 and a first lug 508a of the aircraft structure 302 are coupled via a pin 510a to form a joint 328a (e.g., a pinned lug and clevis joint). However, in some examples, the body 502 of the shield termination fitting 324 may be coupled to the aircraft structure 302 via bolts, brackets, welding, and/or any other fastener(s) and/or fastening technique(s). In some such examples, the joints 328 may be formed via brackets, bolts, welding, cables, clamps, etc.

Figure 6:
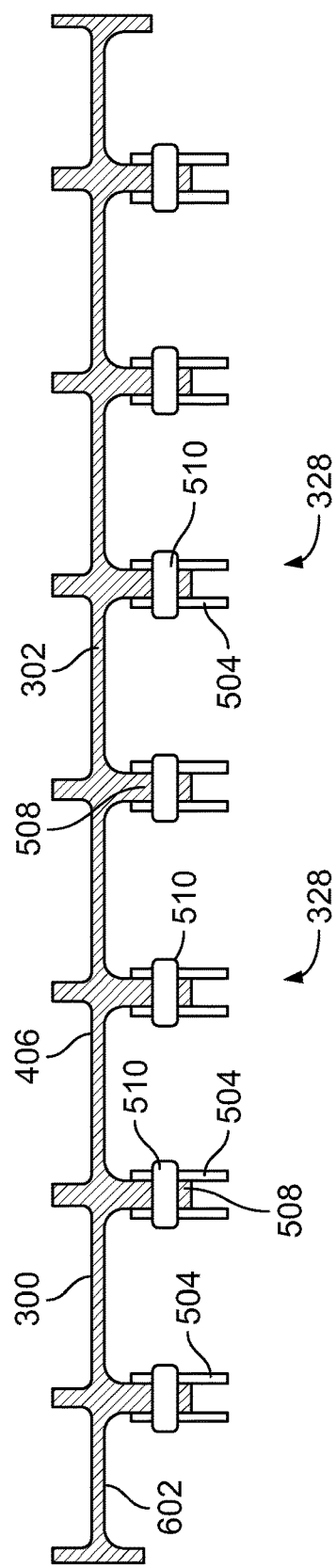
FIG. 6 is a cross-sectional view of the example fan blade containment system taken along line 6-6 of FIG. 3.

FIG. 6 is a cross-sectional view of the fan blade containment system 200 taken along line 6-6 of FIG. 3. In the illustrated example, the lugs 508 are integrally formed with the first engine bay keel 406 of the aircraft structure 302. The lugs of the second engine bay keel 408, the engine mount hanger link fitting 306 and/or the engine mount side link fitting 310 are similar to the lugs 508 of the first engine bay keel 406 shown in FIG. 6. The lugs 508 protrude from a surface or face 602 of the first engine bay keel 406.

As noted above, the shield termination fittings 324, via the joints 328, provide a load path to the aircraft structure 302. The lugs 508 of the illustrated example are coupled or formed with the aircraft structure 302 and transfer loads from the shield termination fittings 324 to the aircraft structure 302. In operation, during a fan blade impact event, for example, at least a portion of the shield 318 of the illustrated example may deflect or bend (e.g., expands, deforms and/or displaces) when the shield 318 absorbs impact energy from the fan blade fragments while the shield termination fittings 324 and the joints 328 (e.g., the lug and clevis joints) maintain the shield 318 anchored to the aircraft structure 302. The shield 318 of the illustrated example prevents or restricts the fan blade fragments from exiting the aircraft engine bay 304. The joints 328 (e.g., the shield termination fittings 324, the devises 504, the lugs 508 and the pins 510) provide a load path to enable the transfer of forces absorbed by the shield 318 to the aircraft structure 302. Thus, relatively high, transient membrane loads generated in the shield 318 by the fan blade fragments may be effectively transferred to the joints 328 and reacted by the aircraft structure 302. Further, during an impact event, the joints 328 (e.g., the shield termination fittings 324, the devises 504, the lugs 508 and the pins 510) provide sufficient holding force to prevent the shield termination fittings 324 from decoupling from the aircraft structure 302. Additionally, during an impact event, the fasteners 506 of the shield termination fittings 324 provide sufficient holding force to prevent the terminating end 326a of the shield 318 from decoupling from the body 502 of the shield termination fittings 324.

Figure 7:
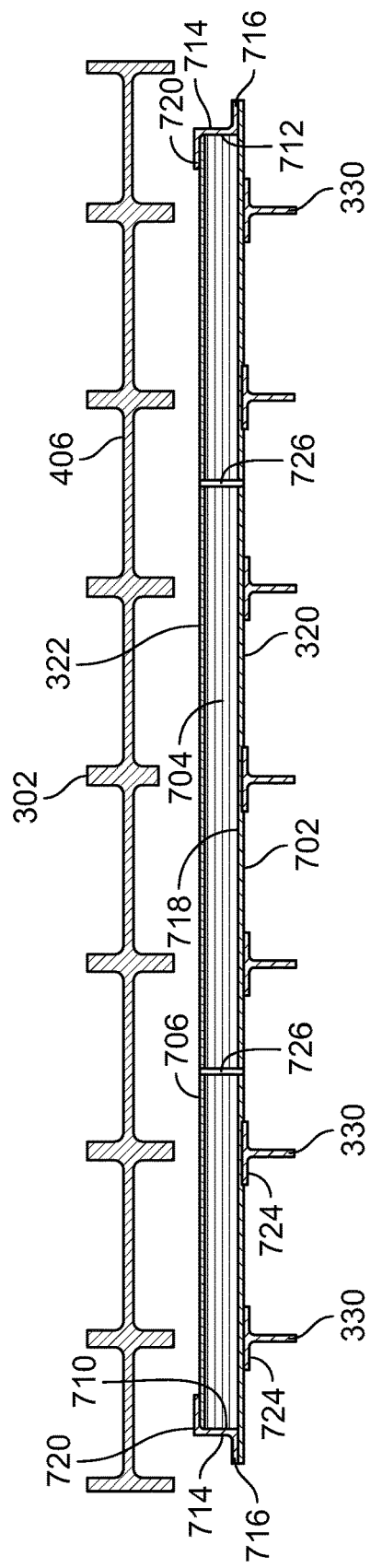
FIG. 7 is a cross-sectional view of the example fan blade containment system taken along line 7-7 of FIG. 3.

FIG. 7 is a cross-sectional view of the example fan blade containment system 200 taken along line 7-7 of FIG. 3. In the illustrated example, the shield 318 is a multi-layer shield. The shield 318 of the illustrated example includes a first layer 702 (e.g., an inner layer), a second layer 704 (e.g. middle layer), and a third layer 706 (e.g., an outer layer). The first layer 702 of the illustrated example defines the impact face 320 of the shield 318 and the third layer 706 of the illustrated example defines the outer face 322 of the shield 318. To surround the aircraft engine 100, the first layer 702, the second layer 704 and/or the third layer 706 may be shaped with an arcuate profile such as, for example, a profile of the shield 318 (e.g., the impact face 320 and the outer face 322) shown in FIG. 3.

The first layer 702 of the shield 318 of the illustrated example provides a first resistance to the fan blade fragments during a fan blade failure. For example, the first layer 702 of the illustrated example blunts the edges of the fan blade fragments prior to the fan blade fragments impacting the second layer 704. The first layer 702 of the illustrated example is a sheet or plate composed of a high strength material such as, for example, steel (e.g., stainless steel, Inconel, etc.).

In the illustrated example, the second layer 704 is an impact absorbing layer that captures or absorbs impact energy (e.g., kinetic energy) from fan blade fragments to prevent or restrict penetration of the fan blade fragments to the third layer 706. The second layer 704 may restrict penetration of the fan blade fragments by significantly reducing a velocity and/or force of the fan blade fragments prior to the fan blade fragments reaching the third layer 706. In some examples, the second layer 704 may prevent penetration of the fan blade fragments from reaching the third layer 706. In some examples, if a fan blade fragment penetrates the second layer 704 and reaches the third layer 706, the energy of the fan blade fragment is reduced significantly such that the fan blade fragment cannot exit the third layer 706 and/or cannot damage surrounding components of the aircraft 302a should the fan blade fragment exit the third layer 706.

The second layer 704 of the illustrated example may be composed of a light weight, high impact energy absorbing material such as, for example, Kevlar (e.g., Kevlar fabric, dry Kevlar fibers, etc.). For example, the second layer 704 of the illustrated example includes multiple layers or plies of dry Kevlar fabric, cloth, or a braided Kevlar fiber weave. In some examples, the second layer 704 may be dry Kevlar fibers that may be woven or braided to form the second layer 704 of the shield 318. The Kevlar fabric/weave may include interconnected fibers that form a lattice pattern. For example, a first set of fibers may be positioned substantially perpendicular (e.g., non-parallel) relative to a second set of fibers. In some examples, to increase the strength of the second layer 704, a thickness of the second layer 704 may be increased. For example, a thicker Kevlar fiber weave or a plurality of Kevlar cloth plies may be stacked to define the second layer 704.

The third layer 706 of the illustrated example provides backing/support to the second layer 704. The third layer 706 of the illustrated example is a plate or sheet composed of a lighter weight material compared to the first layer 702. For example, the third layer 706 of the illustrated example is composed of aluminum. In some examples, the third layer 706 may be composed of composite material(s) such as, for example, a Kevlar/epoxy laminate, a carbon/epoxy laminate, etc. Given that the first layer 702 provides impact resistance and the second layer 704 absorbs (e.g., most of) the impact energy, the third layer 706 may be composed of a lighter material to reduce weight of the fan blade containment system 200. However, in some examples, the third layer 706 may be composed of high strength material (e.g., stainless steel) similar to the first layer 702 to provide an additional barrier to fan blade fragments that may pass through the second layer 704. Thus, in some examples, the third layer 706 may be composed of the same material as the first layer 702. In some examples, the third layer 706 is composed of a material (e.g., aluminum, titanium, etc.) that is different than the material of the first layer 702 (e.g. steel).

A forward edge 710 and/or an aft edge 712 of the shield 318 of the illustrated example include close-out stiffeners 714 (e.g., Z-shaped stiffeners, etc.) to maintain a shape of the shield 318 and/or to cover or seal (e.g., protect) the second layer 704 from the engine bay 304 environment (e.g., elevated temperatures, moisture, engine oil, JP-8 fuel, etc.). The Z-shaped stiffeners 714 may be attached to the first layer 702 and/or the third layer 706 via fasteners (e.g., rivets). For example, a first flange 716 of the Z-shaped stiffeners 714 may be attached to an inner surface 718 of the impact face 320 and/or the first layer 702 and a second flange 720 of the Z-shaped stiffeners 714 may be attached to the outer face 322 (e.g., an outer surface) of the third layer 706. For example, the Z-shaped stiffeners 714 may be attached to the first layer 702 and/or the third layer 706 (e.g., to the inner surface 718 of the impact face 320 and the outer face 322) via protruding head blind rivets. The Z-shaped stiffeners 714 of the illustrated example extend an entire length of the forward edge 710 and an entire length of the aft edge 712, respectively. However, in some examples, the Z-shaped stiffeners 714 may extend along only a portion of the length of the forward edge 710 and/or the aft edge 712.

As noted above, the shield 318 of the illustrated example also includes multiple, circumferential panel stiffeners 330 (e.g., T-shaped stiffeners). The T-shaped stiffeners 330 of the illustrated example include a face 724 (e.g., a flange) to couple the T-shaped stiffeners 330 to the first layer 702. For example, the T-shaped stiffeners 330 of the illustrated example are attached to the impact face 320 of the first layer 702 via fasteners (e.g., protruding head blind rivets, screws, etc.). Additionally, to support or maintain the shape to the shield 318, the shield 318 of the illustrated example includes one or more intermediate fasteners 726. For example, the intermediate fasteners 726 are spaced (e.g., at equal intervals or distances) across the shield 318 between the forward edge 710 and the aft edge 712 and between the respective terminating ends 326 of the shield 318. For example, the intermediate fasteners 726 (e.g., bolts, rivets, stitches, etc.) pass through at least portions of the first layer 702, the second layer 704 and the third layer 706 to ensure that the first layer engages (e.g. directly contacts or tightly presses up against) the second layer 704 and that the second layer engages (e.g., directly contacts or tightly press up against) the third layer 706. In some examples, the shield 318 may not include the Z-shaped stiffeners 714, the T-shaped stiffeners 330 and/or the intermediate fasteners 726.

Figure 8:
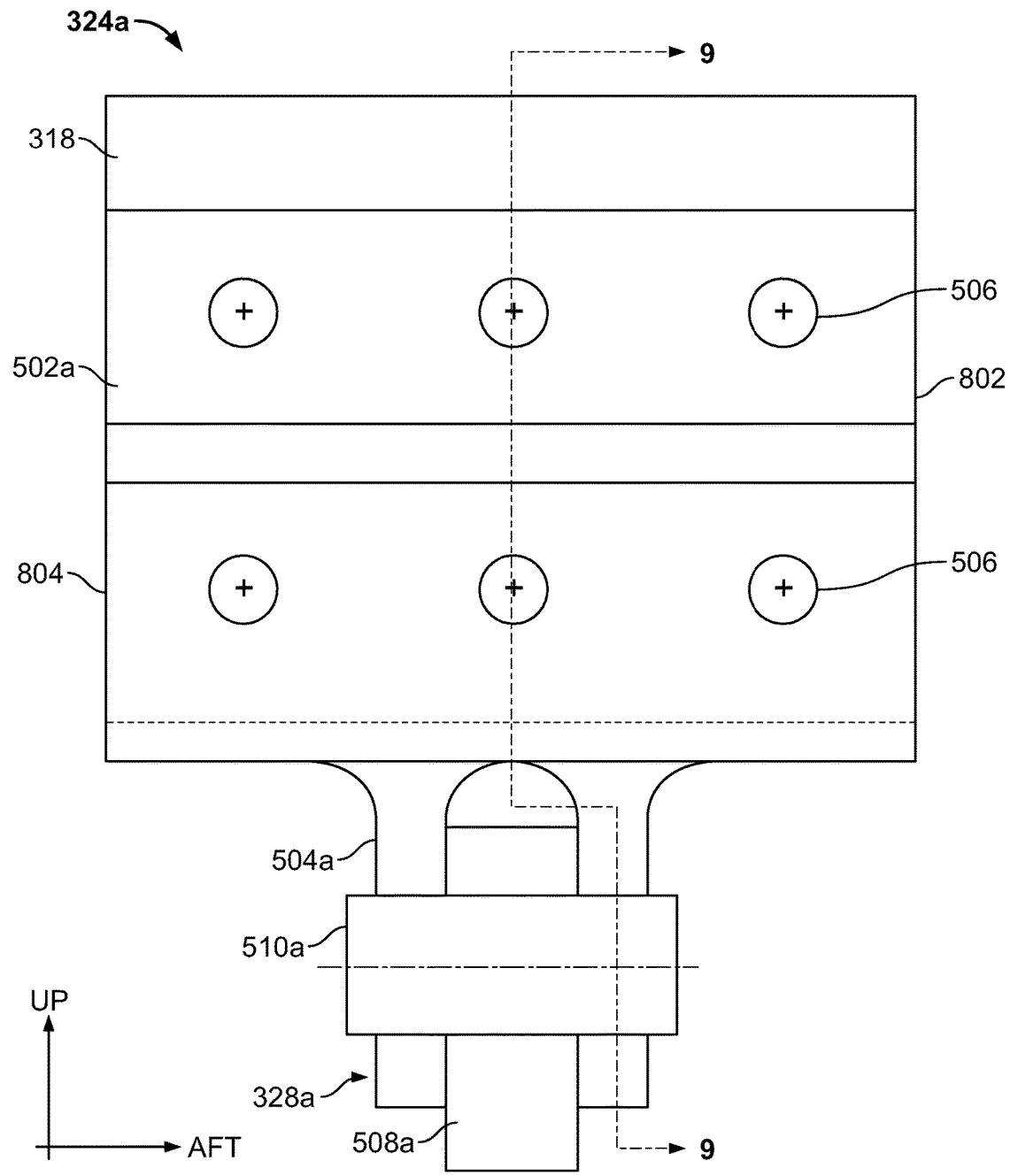
FIG. 8 illustrates a close-up side view of the shield termination fitting of the example fan blade containment system of FIG. 5.

FIG. 8 is a close-up side view of the example shield termination fitting 324 and the terminating end 326 of the shield 318 of the example fan blade containment system 200 of FIG. 5. The shield termination fitting 324 of the illustrated example includes a body 502 and a clevis 504. The body couples the terminating end of the shield 326 to the shield termination fitting 324 via fasteners 506 and the clevis 504 couples the shield termination fitting 324 to the aircraft structure 302 via a joint 328 (e.g., a lug and clevis pinned joint). For example, the clevis 504 receives the lug 508 of the aircraft structure 302 which are coupled via the pin 510. Referring to FIG. 8, the body 502 of the illustrated example is a clamshell joint fitting. The body 502 has a width defined by a first edge 802 and a second edge 804 of the body 502.

Figure 9:
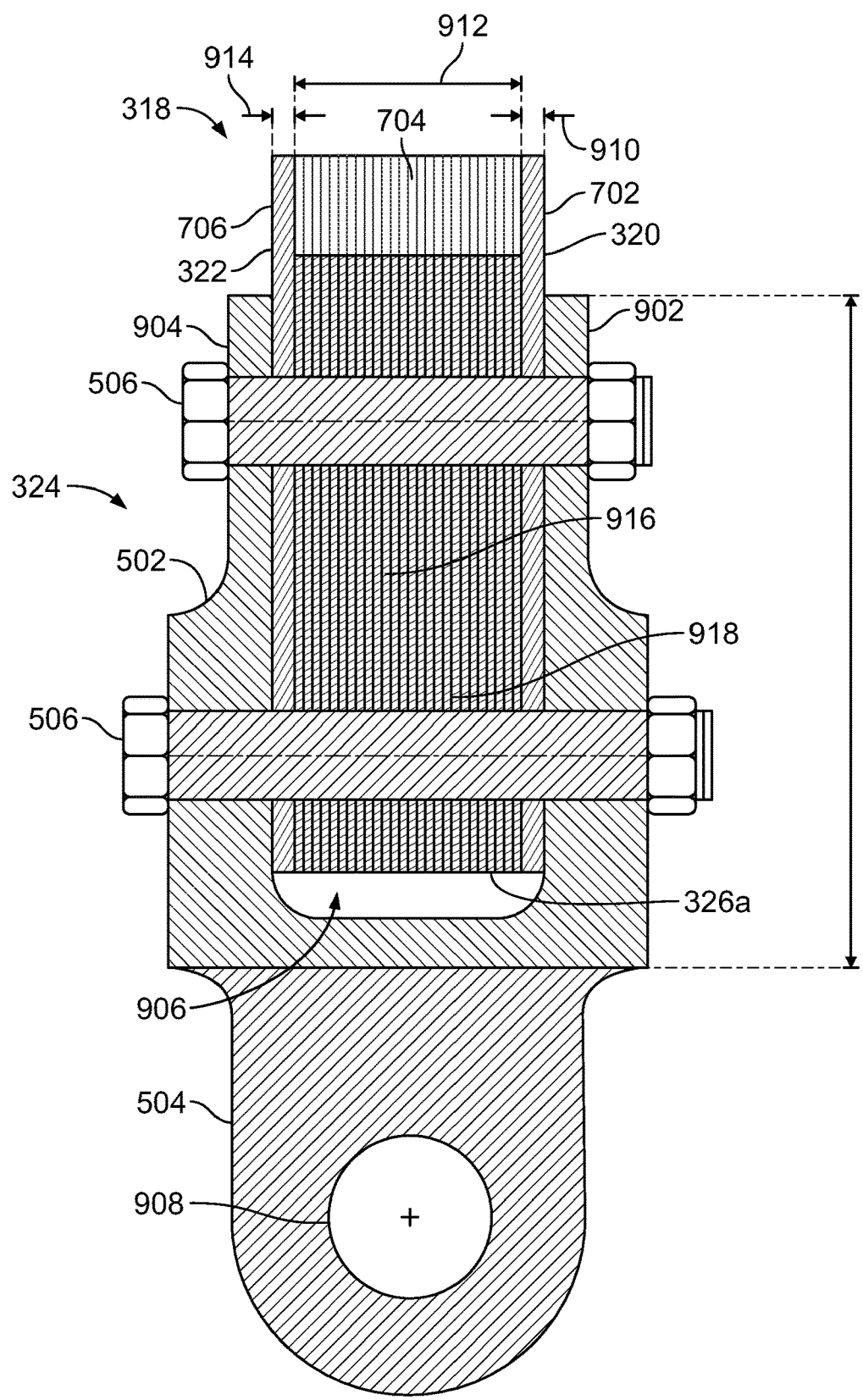
FIG. 9 is a cross-sectional view of the shield termination fitting of the example fan blade containment system taken along line 9-9 of FIG. 8.

FIG. 9 a cross-sectional view of the shield termination fitting 324 and the terminating end 326 of the shield 318 taken along line 9-9 of FIG. 8. The body 502 of the illustrated example has a first side 902 (e.g., a first flange or wall) and a second side 904 (e.g., a second flange or wall) opposite the first side 902. The first side 902, for example, is oriented toward the impact face 320 of the shield 318 and the second side 904 is oriented toward the outer face 322 of the shield 318. The first side 902 of the body 502 of the illustrated example is spaced from the second side 904 to define a cavity 906. The cavity 906 of the illustrated example receives the terminating end 326a of the shield 318. The fasteners 506 extend between the first side 902 and the second side 904 to clamp or couple (e.g., rigidly attach) the terminating end 326a of the shield 318 to the shield termination fitting 324. The clevis 504 protrudes from the body 502 and includes an opening 908 (e.g. a lug pin hole) to receive a respective one of the pins 510. The shield termination fitting 324 of the illustrated example is composed of high strength material(s) such as, for example, titanium, steel (e.g., stainless steel), Inconel, and/or another material(s) having high strength characteristic(s).

In the illustrated example, the first layer 702 has a thickness 910 that is less than a thickness 912 (e.g. one inch) of the second layer 704. In some examples, to increase the strength of the first layer 702, a thickness of the first layer 702 may be increased. For example, a thicker stainless steel sheet or a plurality of stainless steel sheets may be stacked to define the first layer 702. Like the first layer 702, the third layer 706 of the illustrated example has a thickness 914 that is less than a thickness of the second layer 704. In some examples, to increase the strength of the third layer 706, a thickness of the third layer 706 may be increased. For example, a thicker aluminum sheet or a plurality of aluminum sheets may be stacked to define the third layer 706.

To enable the second layer 704 of the illustrated example to receive the fasteners 506, the terminating end 326a of the second layer 704 of the illustrated example includes a reinforced end 916. The reinforced end 916 of the illustrated example is integrally formed with and/or attached to the second layer 704. In other words, the reinforced end 916 of the illustrated example is unitary (e.g., integral) with the second layer 704. The reinforced end 916 of the illustrated example increases strength characteristic(s) of the terminating end 326a to enable the shield 318 to receive the fasteners 506. The reinforced end 916 of the illustrated example is a composite laminate 918 that can be drilled, machined and/or bolted to the body 502 of the shield termination fitting 324. For example, the reinforced end 916 may be drilled with holes to receive the fasteners 506. The high membrane loads from a fan blade fragment impact are transferred from the second layer 704 (e.g., the dry Kevlar fabric) to the body 502 of the shield termination fitting 324 via the reinforced end 916 and the fasteners 506. For improved fastener bearing strength, the reinforced end 916 may include fibers or plies positioned at substantially 45 degrees compared to the orientation of the fibers of the second layer 704 (e.g., the dry Kevlar fabric).

The reinforced end 916 of the illustrated example may be formed by impregnating the terminating end 326a of the second layer 704 with an epoxy resin (or any other suitable polymeric resin). The epoxy resin may then be cured. Once cured, the epoxy resin and the second layer 704 form the composite laminate 918 having relatively high strength and stiffness characteristics. The terminating end 326a of the second layer 704 may be impregnated with the epoxy resin via a resin transfer molding (RTM) process, via a vacuum assisted resin transfer molding (VARTM) process, a resin film infusion (RFI) process, and/or any other suitable polymer matrix composite manufacturing process(es) or technique(s).

Figure 10:
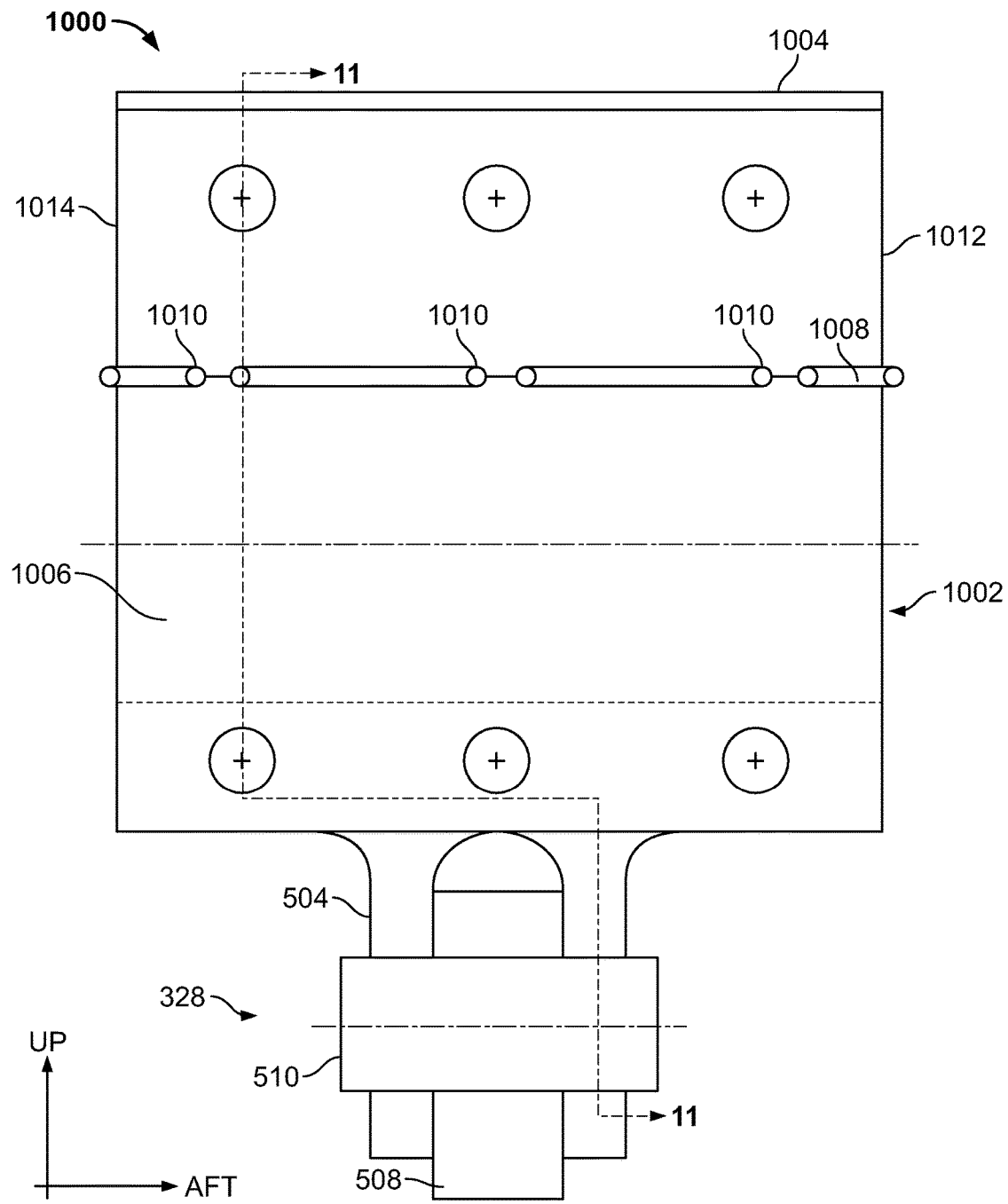
FIG. 10 illustrates a close-up side view of another example fan blade containment system having another example shield termination fitting disclosed herein.

FIG. 10 illustrates another example fan blade containment system 1000 disclosed herein. Those components of the fan blade containment system 1000 of FIG. 10 that are substantially similar or identical to the components of the fan blade containment system 200 described above and that have functions substantially similar or identical to the functions of those components will not be described in detail again below. Instead, the interested reader is referred to the above corresponding descriptions. To facilitate this process, similar reference numbers will be used for like structures. For example, the fan blade containment system 1000 of the illustrated example includes a shield termination fitting 1002 coupled to a shield 1004, where the shield 1004 of the illustrated example includes a first layer 702 (e.g., the inner layer) and a third layer 706 (e.g., the outer layer) that is substantially similar (e.g., identical) to the first layer 702 and the third layer 706 of the shield 318. As described in greater detail in FIG. 11, although the shield 1004 of the illustrated example includes a second layer 1102 (e.g., a middle layer shown in FIG. 11) composed of a material (e.g., dry Kevlar) similar to the second layer 704 of the shield 318, the shield 1004 of the illustrated example does not include the composite laminate 918 at the terminating end 326a of the shield 318.

The fan blade containment system 1000 of the illustrated example includes the shield termination fitting 1002 to couple the shield 1004 to the aircraft structure 302. In particular, the shield termination fitting 1002 of the illustrated example includes a body 1006 and a clevis 504. The clevis 504 couples the shield termination fitting 1002 and the shield 1004 to the aircraft structure 302 via a joint 328 (e.g., a lug and clevis pinned joint). For example, the clevis 504 receives the lug 508 of the aircraft structure 302 which are coupled via the pin 510. The shield 1004 of the illustrated is coupled to the body 1006 of the shield termination fitting 1002 via a cable 1008 (e.g., a high strength steel cable, a fastener, etc.). As shown in FIG. 10, the cable 1008 is interwoven or intertwined through the body 1006 and the shield 1004 at various locations 1010 across a width of the body 1006 between a first end 1012 and a second end 1014 opposite the first end 1012. To provide clamp-up force, the cable of the illustrated example is tensioned and respective ends of the cable are permanently swaged together. During an impact event, the shield 1004 absorbs loads generated by the fan blade fragments. The loads are then transferred or reacted by the aircraft structure 302 via the joint 328 (e.g., the body 1006 of the shield termination fitting 1002, the clevis 504, the pin 510 and the lug 508).

Figure 11:
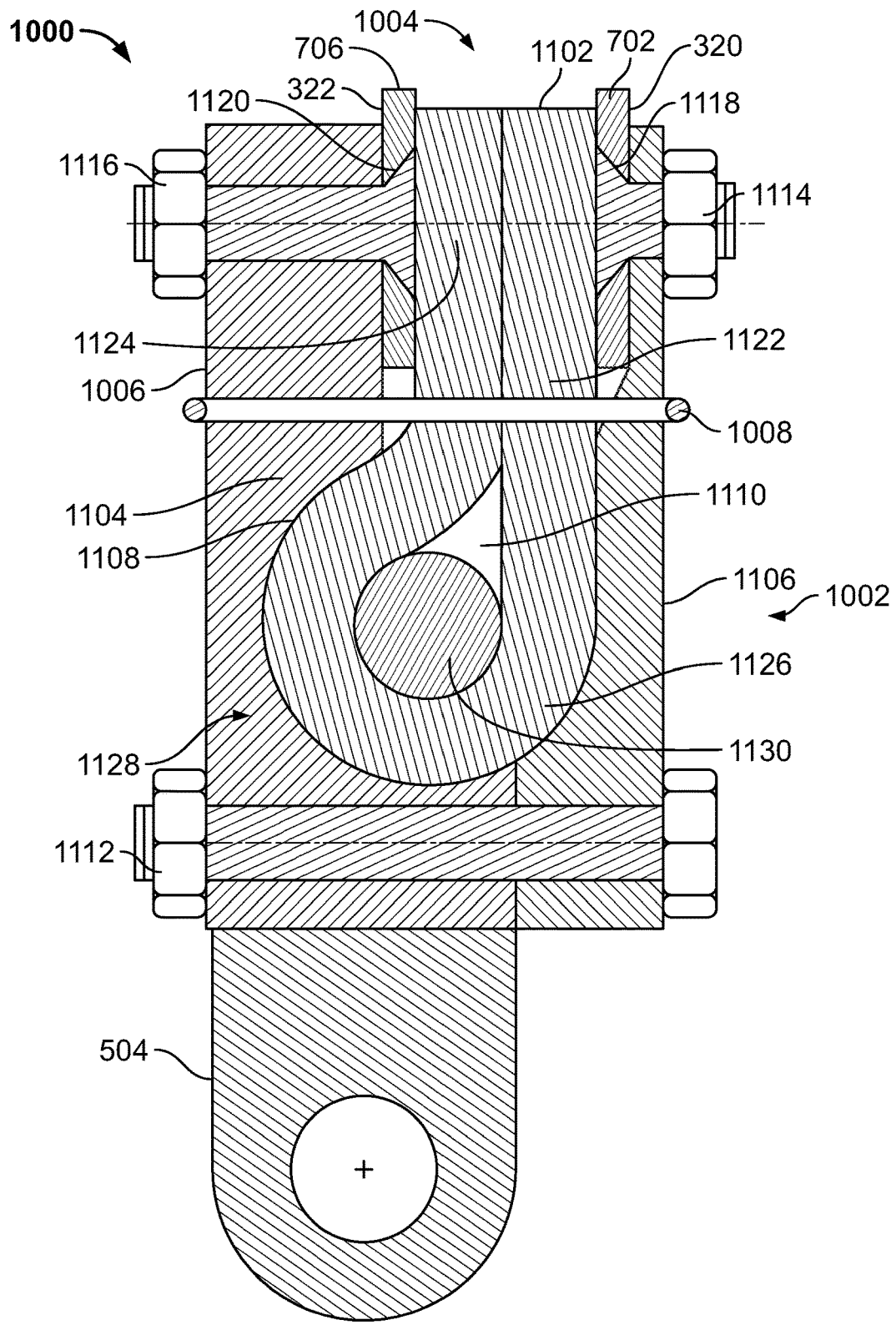
FIG. 11 is a cross-sectional view of the example shield termination fitting of FIG. 10 taken along line 11-11 of FIG. 10.

FIG. 11 is a cross-sectional view of the shield termination fitting 1002 of the example fan blade containment system 1000 taken along line 11-11 of FIG. 10. The body 1006 of the shield termination fitting 1002 of the illustrated example includes a base 1104 (e.g., a plate) and a cover 1106 (e.g., a plate) removably coupled to the base 1104. The base 1104 of the illustrated example includes a groove or arcuate surface 1108 (e.g., a geometrical shape, a curved portion, an arcuate profile, etc.) to receive and/or retain the energy absorbing second layer 1102 (e.g., the middle layer) of the shield 1004 in a cavity 1110 formed between the cover 1106 and the base 1104. The cover 1106 of the illustrated example is coupled to the base 1104 via a fastener 1112 (e.g., a nut and bolt). In the illustrated example, the cover 1106 is oriented toward the impact face 320 of the shield 318 and the base is oriented toward the outer face 322. However, in some examples, the base 1104 may be oriented toward the impact face 320 and the cover 1106 may be oriented toward the outer face 322.

The shield 1004 of the illustrated example is a multilayer shield. The shield 1004 of the illustrated example includes the first layer 702 (e.g. an inner layer), the second layer 1102 (e.g. a middle layer) and the third layer 706 (e.g. an outer layer). The first layer 702 of the illustrated example defines the impact face 320 of the shield 1004 and the third layer 706 of the illustrated example defines the outer face 322 of the shield 1004. The first layer 702 is coupled or attached to the cover 1106 of the body 1006 via a first fastener 1114 (e.g., a nut and bolt). Similarly, the third layer 706 is coupled or attached to the base 1104 of the body 1006 via a second fastener 1116 (e.g., a nut and bolt). Thus, the first layer 702 of the illustrated example may be coupled to the cover 1106 and the third layer 706 of the illustrated example may be coupled to the base 1104 prior to positioning of the second layer 1102 between the first layer 702 and the third layer 706. Further, the first layer 702 of the illustrated example includes a countersunk hole 1118 to receive a countersink head of the first fastener 1114 and the third layer 706 of the illustrated example includes a countersunk hole 1120 to receive a countersink head of the second fastener 1116. Thus, the respective heads of the first fastener 1114 and the second fastener 1116 may be flush relative to the second layer 1102 and/or the respective first layer 702 and the third layer 706. The first layer 702 of the illustrated example may be composed of a high strength material such as steel (e.g., stainless steel, Inconel, etc.) and the third layer 706 may be composed of a different material (e.g. aluminum, Kevlar/epoxy, carbon/epoxy, etc.) that is lighter in weight compared to the material of the first layer 702. However, in some examples, the first layer 702 and the third layer 706 may be composed of the same material(s).

The second layer 1102 of the illustrated example is a dry Kevlar fabric. More specifically, the second layer 1102 of the illustrated example includes a first portion 1122 (e.g., a first half of a plurality of cloth plies) and a second portion 1124 (e.g., a second half of a plurality of cloth plies). In particular, the first portion 1122 of the illustrated example is folded relative to the second portion 1124 to form a loop 1126 at a terminating end 1128 of the second layer 1102. For example, a first end (e.g., the first end 402 of FIG. 4A) of the second layer 1102 includes a first loop (e.g., the loop 1126) and a second end (e.g., the second end 404 of FIG. 4A) includes a second loop (e.g., the loop 1126). The second layer 1102 of the illustrated example may be a unitary body formed as a continuous loop and is configured to provide the loop 1126 at each terminating end 1128 (e.g., the terminating ends 326 of FIGS. 4A and 4B).

To retain the second layer 1102 in the cavity 1110, the shield termination fitting 1002 of the illustrated example includes a rod 1130. More specifically, the retention rod 1130 is positioned at the terminating end 1128 of the second layer 1102 between the first portion 1122 of the second layer 1102 and the second portion 1124 of the second layer 1102. In other words, the rod 1130 is positioned inside the loop 1126. Each loop 1126 of the second layer 1102 includes a rod 1130 (e.g., a retention rod). For example, the shield 1004 may include a first rod (e.g., the rod 1130) positioned in a first loop (e.g., the loop 1126) positioned adjacent to a first aircraft structural member (e.g. the first engine bay keel 406 of FIG. 4A) of the aircraft structure 302, and a second rod (e.g., the rod 1130) positioned in a second loop (e.g., the loop 1126) adjacent to a second aircraft structural member (e.g. the second engine bay keel 408 of FIG. 4A) of the aircraft structure 302 opposite the first loop. The rod 1130 of the illustrated example may be composed of a high strength material (e.g., titanium, steel, etc.). In some examples, the rod 1130 may be composed of a lower strength and/or lighter weight structural material (e.g. aluminum, carbon/epoxy, etc.).

After the rod 1130 is positioned in the loop 1126, the terminating end 1128 (e.g., the loop 1126 and the rod 1130) of the second layer 1102 is positioned in the cavity 1110 of the base 1104. The cover 1106 is then fastened to the base 1104 to clamp the rod 1130 and the loop 1126 in the cavity 1110. To help retain the loop 1126 and the rod 1130 in the cavity 1110, the arcuate surface 1108 of the base 1104 receives at least a portion of the loop 1126 and/or the rod 1130. Thus, the arcuate surface 1108 of the base 1104 clamps and holds the rod 1130 between the cover 1106 and the base 1104. The cover 1106, when coupled to the base 1104, engages (e.g., imparts a holding or clamping force to) the rod 1130 to prevent the terminating end 1128 of the second layer 1102 of the shield 1004 from escaping the cavity 1110 when the second layer 1102 of the shield 1004 is impacted by fan blade fragments during an impact event. Thus, a clamp up force is generated between the cover 1106 and the base 1104 when the cover 1106 is fastened to the base 1104 (via the fasteners 1112) and this clamp-up force retains (e.g., rigidly couples) the terminating end 1128 of the second layer 1102 of the shield 1004 to the shield termination fitting 1002.

To provide additional clamp-up force and to retain the terminating end 1128 of the second layer 1102 of the shield 1004 in the cavity 1110 of the shield termination fitting 1002, the fan blade containment system 1000 of the illustrated example employs the cable 1008. The cable 1008 of the illustrated example has a relatively small diameter and can pass through the second layer 1102 without affecting performance characteristics (e.g., tensile characteristic, energy absorbing characteristics, etc.) of the second layer 1102. The cable 1008 of the illustrated example is a steel cable (e.g., a stainless steel cable) having a relatively small diameter and high strength that can pass through a second layer composed of fabric without damaging fibers of the fabric layer material. For example, the cable 1008 is positioned between fibers of the second layer 1102. For example, the second layer 1102 of the illustrated example may include first fibers that are substantially perpendicular relative to second fibers to form a lattice pattern. The cable 1008 may be positioned through an opening between a first fiber and the second fiber of the second layer 1102 (e.g., without ripping, tearing or damaging the fibers of the second layer 1102). Thus, the cable 1008 does not require formation of apertures or passageways through the second layer 1102 (e.g., via drilling). Additionally, the cable 1008 passes through one or more holes (e.g., drilled) in the base 1104 and the cover 1106. In the illustrated example, the cable 1008 is positioned between (e.g., above) the rod 1130 and (e.g., below) respective ends of the first layer 702 and the third layer 706. As noted above in connection with FIG. 10, the cable 1008 passes through the second layer 1102, the base 1104, and the cover 1106 at various locations across an entire width of the shield termination fitting 1002. In addition to the clamping force provided by the cover 1106, the base 1104, and the fasteners 1112, the tensioned cable 1008 provides a holding force to retain the terminating end 1128 of the of the second layer 1102 of the shield 1004 within the cavity 1110 of the shield termination fitting 1002. In operation, loads imparted to the second layer 1102 are transferred to the body 1006 of the shield termination fitting 1002 via the rod 1130.

Figure 12:
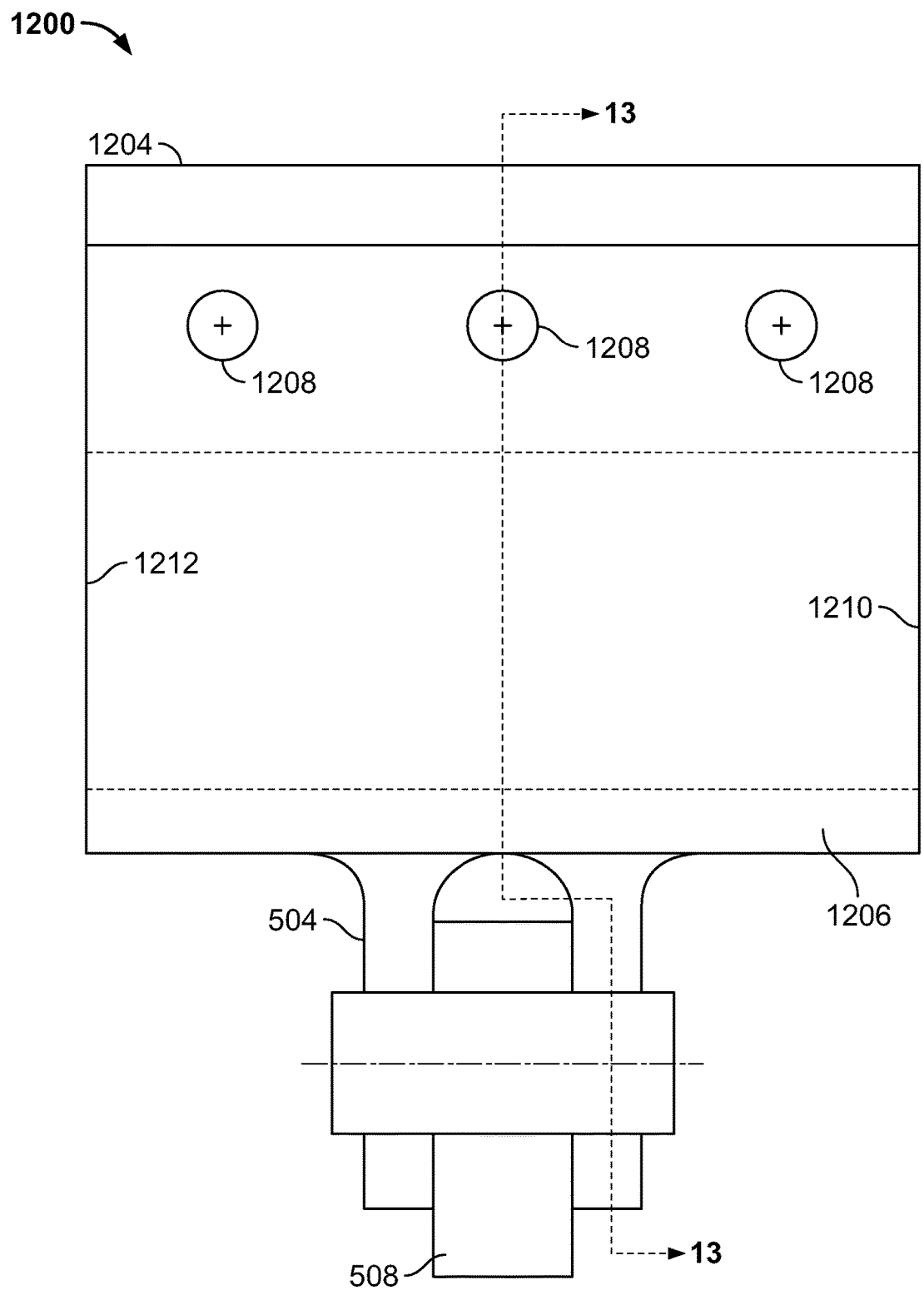
FIG. 12 illustrates a close-up side view of another example fan blade containment system having another example shield termination fitting disclosed herein.

FIG. 12 illustrates another example fan blade containment system 1200 disclosed herein. Those components of the example fan blade containment system 1200 of FIG. 12 that are substantially similar or identical to the components of the fan blade containment system 200 or the fan blade containment system 1000 described above and that have functions substantially similar or identical to the functions of those components will not be described in detail again below. Instead, the interested reader is referred to the above corresponding descriptions. To facilitate this process, similar reference numbers will be used for like structures.

The fan blade containment system 1200 of the illustrated example includes a shield termination fitting 1202 to couple a shield 1204 to the aircraft structure 302. The shield termination fitting 1202 of the illustrated example includes a body 1206 and a clevis 504. Unlike the shield termination fitting 1002 of FIGS. 10 and 11, the shield termination fitting 1202 of the illustrated example is a unitary body or structure. The fan blade containment system 1200 of the illustrated example includes holes 1208 between a first edge 1210 of the body 1206 and a second edge 1212 of the body 1206 opposite the first edge 1210.

Figure 13:
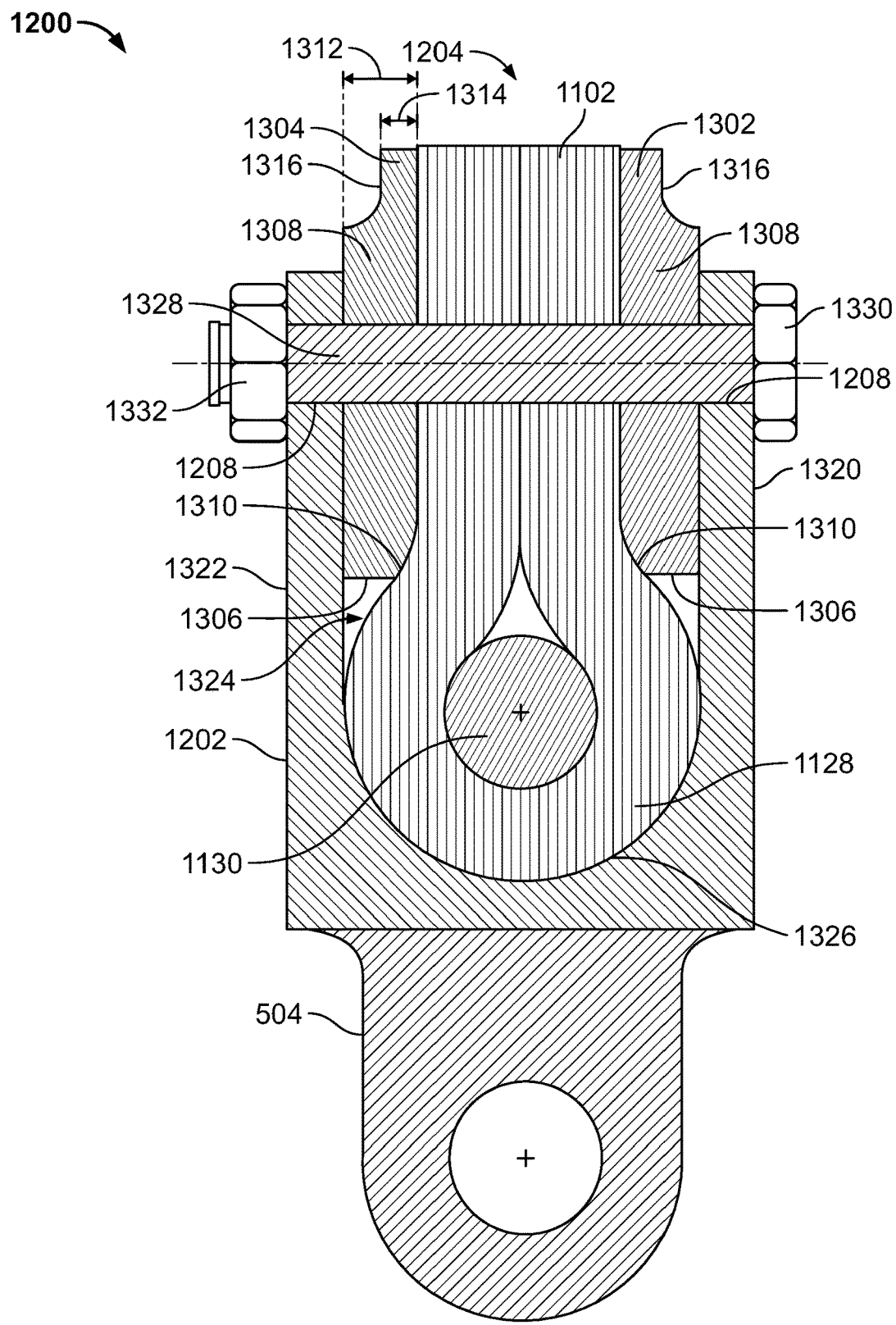
FIG. 13 is a cross-sectional view of the example shield termination fitting of FIG. 13 taken along line 13-13 of FIG. 12

FIG. 13 is a cross-sectional view of the shield termination fitting 1202 of the example fan blade containment system 1200 taken along line 13-13 of FIG. 12. The shield 1204 of the illustrated example includes a first layer 1302, a second layer 1102, and a third layer 1304, where the second layer 1102 is positioned between the first layer 1302 and the third layer 1304. The first layer 1302 and the third layer 1304 of the illustrated example are substantially similar to the first layer 702 and the third layer 706 of the example shields 318 and 1004 described above. However, the first layer 1302 and the third layer 1304 of the illustrated example include respective ends 1306 having a thicker profile 1308 and a bearing surface 1310. The thicker profile 1308 of the respective ends 1306 has a dimensional characteristic 1312 (e.g., a thickness) that is greater than a dimensional characteristic 1314 (e.g., a thickness) of the first layer 1302 and the third layer 1304. In some examples, the thicker profile 1308 is formed by stacking plates (e.g. shims) to a surface or face 1316 of the first layer 1302 and/or the third layer 1304. In some examples, the first layer 1302 and/or the third layer 1304 are formed with the respective thicker ends during manufacturing (e.g., e.g., via machining, 3-D printing, etc.). The second layer 1102 is substantially similar to the layer 1102 of FIGS. 10-11.

The body 1206 of the shield termination fitting 1202 is a unitary body defining a first side 1320 (e.g., a first flange, wall or face) and a second side 1322 (e.g., a second flange, wall or face) spaced from the first side 1320 to define a cavity 1324. The cavity 1324 of the illustrated example receives the terminating end 1128 and the rod 1130 of the second layer 1102. To couple the shield 1204 to the shield termination fitting 1202, the shield 1204 (e.g., the first layer 1302, the second layer 1102 and the third layer 1304) is positioned (e.g., slid, inserted) in the cavity 1324 from an opening (e.g., an upper opening) of the cavity 1324. The cavity 1324 may include an arcuate surface 1326 to receive (e.g., mate with) the terminating end 1128 or the loop 1126 of the second layer 1102. After the shield 1204 is positioned in the cavity 1324, one or more fasteners 1328 are coupled to the shield 1204 via the holes 1208. For example, the fastener 1328 of the illustrated example passes through the first side 1320 of the shield termination fitting 1202, the first layer 1302, the second layer 1102, the third layer 1304 and the second side 1322 of the shield termination fitting 1202. A head 1330 of the fastener engages the first side 1320 and the mating nut 1332 of the fastener 1328 engages the second side 1322. Thus, the fastener 1328 of the illustrated example provides a clamping force to retain or couple the shield 1204 to the shield termination fitting 1202.

In the illustrated example, the second layer 1102 (e.g., the dry Kevlar) includes openings (e.g., through holes) to receive the fasteners 1328 passing through the body 1206 and the shield termination fitting 1202. In some examples, to form or provide the openings that receive the fasteners 1328, the second layer 1102 (e.g., the dry Kevlar layer) may be formed (e.g. braided) with the openings (e.g., full size holes that align with the openings 1208). In some examples, to form or provide the openings that receive the fasteners 1328, material of the second layer 1102 may be removed via a secondary material removal operation(s) (e.g. cut-out using a die punch). In some such examples, a strength characteristic of the second layer 1102 adjacent the openings to receive the fasteners 1328 may be reduced because of a reduction in cross-sectional area at the openings. To compensate for this reduction in strength adjacent to the openings of the second layer 1102, a thickness of the second layer 1102 (e.g., the Kevlar) may be increased relative to a thickness of other example second layers (e.g., the second layer 702) of other example shield terminations disclosed herein. For example, additional layers or plies of material may be provided to form the second layer 1102 with an increased thickness.

During a blade impact event, the retention rod 1130 retains the shield 1204 in the cavity 1324. For example, the arcuate bearing surfaces 1310 at the respective ends 1306 of the first layer 1302 and the third layer 1304 engage the second layer 1102 (e.g., the loop 1126) and/or the retention rod 1130. Thus, a force (e.g., an upward force) attempting to pull the shield 1204 from the cavity 1324 is reacted via a force to be provided via engagement between the retention rod 1130, the second layer 1102 (e.g., the loop 1126) and the arcuate bearing surfaces 1310 of the first layer 1302 and third layer 1304. Thus, when positioned in the cavity 1324, the retention rod 1130, the arcuate bearing surfaces 1310, and/or the fastener 1328 prevents the terminating end 1128 of the shield 1204 from escaping the cavity 1324 when fan blade fragments impact the second layer 1102 during an impact event.

The foregoing examples of the fan blade containment systems 200, 1000 and 1200 can be employed with an aircraft and/or aircraft engine. Although each example fan blade containment systems disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. In some examples, a fan blade containment system disclosed in accordance with the teachings of this disclosure may have a combination of the shields 318, 1004 and 1204 and/or the shield termination fittings 324, 1002 and 1202 disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fan blade containment system comprising:
a shield to be coupled to an aircraft structure and to at least partially surround a circumference of an aircraft engine, the shield to be spaced from an outer surface of the aircraft engine when the shield is coupled to the aircraft structure; and
a first shield termination fitting coupled to a first terminating end of the shield, the first shield termination fitting to couple the first terminating end of the shield to a first portion of the aircraft structure; and
a second shield termination fitting coupled to a second terminating end of the shield, the second shield termination fitting to couple the second terminating end of the shield to a second portion of the aircraft structure.

2. The system of claim 1, wherein the shield includes a first layer, a second layer, and a third layer, wherein the second layer is positioned between the first layer and the third layer.

3. The system of claim 2 wherein the first layer includes steel, the second layer includes a dry Kevlar fabric, and the third layer includes aluminum.

4. The system of claim 2, wherein the first terminating end includes a composite laminate, the composite laminate having a hole to receive a fastener.

5. The system of claim 4, wherein the first shield termination fitting includes a body defining a cavity to receive the first terminating end of the shield, wherein the body receives the fastener to retain the first terminating end of the shield in the cavity.

6. The system of claim 5, wherein the first shield termination fitting includes a clevis projecting from the body, the clevis to couple to the aircraft structure, the body and the clevis being a unitary structure, the body including a first wall spaced from a second wall to define the cavity to receive the first terminating end.

7. The system of claim 2, wherein the second layer includes a first portion folded over a second portion to form a loop at the first terminating end of the shield.

8. The system of claim 7, further including a rod to be positioned in the loop, the rod and the loop to be positioned in a cavity of the first shield termination fitting, the rod to retain the loop in the cavity of the first shield termination fitting.

9. The system of claim 8, wherein the first shield termination fitting includes a body and a clevis, the body defining the cavity and the clevis to couple the shield termination fitting to the aircraft structure.

10. The system of claim 9 wherein the body receives a tensioned cable to provide clamp-up force and to retain the first terminating end of the shield in the cavity.

11. The system of claim 10, wherein the first terminating end of the second layer is interwoven with the tensioned cable and retained in the cavity of the first shield termination fitting.

12. The A fan blade containment system comprising:
a shield to be coupled to an aircraft structure and to at least partially surround a circumference of an aircraft engine, the shield to be spaced from an outer surface of the aircraft engine when the shield is coupled to the aircraft structure;
a shield termination fitting coupled to a terminating end of the shield, the shield termination fitting to couple the terminating end of the shield to the aircraft structure, the shield including a first layer, a second layer, and a third layer, the second layer positioned between the first layer and the third layer, the second layer includes a first portion folded over a second portion to form a loop at the terminating end of the shield; and
a rod to be positioned in the loop, the rod and the loop to be positioned in a cavity of the shield termination fitting, the rod to retain the loop in the cavity of the shield termination fitting, the shield termination fitting including a body and a clevis, the body defining the cavity and the clevis to couple the shield termination fitting to the aircraft structure, the body structured to receive a tensioned cable to provide clamp-up force and to retain the terminating end of the shield in the cavity, the terminating end of the second layer being interwoven with the tensioned cable and retained in the cavity of the shield termination fitting, and wherein the body has a cover removably coupled to a base to access the cavity, the cover to provide a clamping force to the terminating end of the shield to retain the terminating end of the shield in the cavity when the cover is coupled to the base.

13. The A fan blade containment system comprising:
a shield to be coupled to an aircraft structure and to at least partially surround a circumference of an aircraft engine, the shield to be spaced from an outer surface of the aircraft engine when the shield is coupled to the aircraft structure;
a shield termination fitting coupled to a terminating end of the shield, the shield termination fitting to couple the terminating end of the shield to the aircraft structure, wherein the shield includes a first layer, a second layer, and a third layer, the second layer positioned between the first layer and the third layer, the second layer including a first portion folded over a second portion to form a loop at the terminating end of the shield; and
a rod to be positioned in the loop, the rod and the loop to be positioned in a cavity of the shield termination fitting, the rod to retain the loop in the cavity of the shield termination fitting, the shield termination fitting including a body and a clevis, the body defining the cavity and the clevis to couple the shield termination fitting to the aircraft structure, and wherein the shield termination fitting has a unitary body having a first plate and a second plate opposite the first plate to define the cavity, a bolt to pass through the first plate and the second plate, the cavity defining arcuate bearing surfaces, the bolt and the arcuate bearing surfaces are to retain the terminating end of the shield in the cavity.

14. A fan blade containment system comprising:
a shield having a unitary body including a first end and a second end opposite the first end, the first end to couple to a first structural member of an aircraft structure and the second end to couple to a second structural member of the aircraft structure, the shield including impact absorbing material that is to absorb kinetic energy from fan blade fragments during a fan blade failure event;
a first shield termination fitting having a first body and a first clevis, the first body defining a first cavity to receive the first end of the shield and the first clevis to couple the first end of the shield to the aircraft structure; and
a second shield termination fitting having a second body and a second clevis, the second body defining a second cavity to receive the second end of the shield and the second clevis to couple the second end of the shield to the aircraft structure.

15. The system of claim 14, wherein the shield further includes a notched opening to be positioned adjacent an engine mount of the aircraft structure.

16. The system of claim 15, further including a third shield termination fitting having a third body and a third clevis, the third body defining a third cavity to receive a third end of the shield at the notched opening, the third clevis to couple the third end of the shield defined by the notched opening to the engine mount.

17. The system of claim 16, wherein at least one of the first end, the second end or the third end of the shield includes a composite laminate.

18. The system of claim 17, wherein the composite laminate of the shield receives one or more fasteners to couple the shield to the at least one of the first shield termination fitting, the second shield termination fitting or the third shield termination fitting.

19. The system of claim 16, wherein at least one of the first end, the second end or the third end of the shield includes a loop to receive a retention rod.

20. The system of claim 19, wherein the impact absorbing material of the shield receives a cable to couple the shield to the at least one of the first shield termination fitting, the second shield termination fitting or the third shield termination fitting.

21. A fan blade containment system comprising:
means for capturing fan blade fragments and absorbing their impact energy during a fan blade failure event of an aircraft engine, the means for capturing and absorbing having a first terminating end to couple to a first portion of an aircraft structure and a second terminating end opposite the first terminating end to couple to a second portion of the aircraft structure, the means for capturing and absorbing to be spaced from an outer surface of the aircraft engine when the means for capturing and absorbing is coupled to the aircraft structure;

first means for coupling the first terminating end of the means for capturing and absorbing to the aircraft structure and second means for coupling the second terminating end of the means for capturing and absorbing; and first means for fastening the first terminating end of the means for capturing and absorbing to the first means for coupling and second means for fastening the second terminating end of the means for capturing and absorbing to the second means for coupling.

22. The system of claim 21, wherein the first means for fastening passes through at least a portion of the means for capturing and absorbing.

* * * * *

UNITED STATES PATENT AND TRADEMARK OFFICE
CERTIFICATE OF CORRECTION

PATENT NO. : 10,550,718 B2
APPLICATION NO. : 15/476027
DATED : February 4, 2020
INVENTOR(S) : Carlos Angelo Fracchia et al.

It is certified that error appears in the above-identified patent and that said Letters Patent is hereby corrected as shown below:

In the Claims

Column 21, Claim 12, Line 29, replace "The A" with --A--

Column 21, Claim 13, Line 60, replace "The A" with --A--

Signed and Sealed this
Seventh Day of April, 2020

Andrei Iancu
*Director of the United States Patent and Trademark Office*